(12) United States Patent
Robinson

(10) Patent No.: US 10,460,407 B2
(45) Date of Patent: Oct. 29, 2019

(54) SYSTEMS AND METHODS FOR PROVIDING COMMUNICATION SERVICES

(71) Applicant: Jessica Robinson, Indianapolis, IN (US)

(72) Inventor: Jessica Robinson, Indianapolis, IN (US)

( * ) Notice: Subject to any disclaimer, the term of this patent is extended or adjusted under 35 U.S.C. 154(b) by 67 days.

(21) Appl. No.: 14/718,069

(22) Filed: May 20, 2015

(65) Prior Publication Data
US 2015/0339790 A1 Nov. 26, 2015

Related U.S. Application Data

(60) Provisional application No. 61/948,024, filed on May 20, 2014, provisional application No. 62/083,844, filed on Nov. 24, 2014.

(51) Int. Cl.
*G06Q 50/20* (2012.01)
*G09B 19/06* (2006.01)
*G06F 17/28* (2006.01)
*G09B 21/00* (2006.01)
*G09B 5/06* (2006.01)

(52) U.S. Cl.
CPC ......... *G06Q 50/2053* (2013.01); *G06F 17/28* (2013.01); *G09B 5/06* (2013.01); *G09B 19/06* (2013.01); *G09B 21/00* (2013.01); *G09B 21/006* (2013.01); *G09B 21/009* (2013.01)

(58) Field of Classification Search
CPC .... G06F 17/28; G06Q 50/2053; G09B 19/06; G09B 21/006; G09B 21/00; G09B 21/008; G09B 21/009; G09B 5/06

USPC .............................. 704/2, 235, 277; 715/265
See application file for complete search history.

(56) References Cited

U.S. PATENT DOCUMENTS

| | | | |
|---|---|---|---|
| 7,746,986 B2 | 6/2010 | Bucchieri et al. | |
| 7,792,676 B2* | 9/2010 | Klinefelter | G06Q 10/10 704/271 |
| 8,566,081 B2 | 10/2013 | Schoenbach et al. | |

(Continued)

OTHER PUBLICATIONS

American Sign Language University (ASLU) webpage archive Mar. 13, 2013.*

(Continued)

*Primary Examiner* — Angela A Armstrong
(74) *Attorney, Agent, or Firm* — Reichel Stohry Dean LLP; Natalie J. Dean

(57) ABSTRACT

Systems for providing network-based communication services are provided, such systems comprising a platform configured to facilitate interaction between users requesting interpretation/translation services and individuals capable of fulfilling such requests. Both the content submitted through the system for interpretation/translation and the resulting interpretation/translation may be prerecorded, which facilitates the accuracy of the end-product. Methods for facilitating communication services over a network are also provided, such methods comprising the steps of receiving a request for interpretation/translation, receiving acceptance of the request from an interpreter/translator, receiving a response that corresponds with an interpretation/translation of the content, and making the response available to one or more users via a server.

20 Claims, 10 Drawing Sheets

(56) References Cited

U.S. PATENT DOCUMENTS

| | | | |
|---|---|---|---|
| 2002/0069067 A1 | 6/2002 | Klinefelter et al. | |
| 2003/0069997 A1* | 4/2003 | Bravin | G06F 17/2765 709/250 |
| 2007/0140443 A1* | 6/2007 | Woodring | H04M 3/53366 379/88.06 |
| 2009/0012788 A1* | 1/2009 | Gilbert | G09B 21/009 704/235 |
| 2010/0198580 A1 | 8/2010 | Klinefelter et al. | |
| 2010/0291968 A1* | 11/2010 | Ander | G06F 17/28 455/556.1 |
| 2011/0077933 A1* | 3/2011 | Miyamoto | G06F 17/289 704/2 |
| 2012/0052467 A1* | 3/2012 | Maybin | G09B 19/06 434/157 |
| 2012/0176466 A1 | 7/2012 | Wrench | |
| 2012/0240039 A1* | 9/2012 | Walker | G06F 17/2836 715/265 |
| 2013/0066630 A1* | 3/2013 | Roe | G10L 15/26 704/235 |
| 2013/0204605 A1* | 8/2013 | Illgner-Fehns | G09B 21/009 704/2 |
| 2014/0046661 A1* | 2/2014 | Bruner | H04N 21/4884 704/235 |
| 2014/0142917 A1* | 5/2014 | D'Penha | G06F 17/2836 704/2 |
| 2014/0343919 A1* | 11/2014 | Kapoor | G06F 9/454 704/2 |
| 2015/0039295 A1* | 2/2015 | Soschen | G06F 17/28 704/9 |
| 2015/0121215 A1* | 4/2015 | Wohlert | H04M 1/72591 715/706 |

OTHER PUBLICATIONS

Lionbridge Translation Services webpage archive Mar. 25, 2014.*
Webpage ASLU (American Sign Language University webpage Mar. 13, 2013 archive, hereinafter, ASLU).*
Webpage ASLU (American Sign Language University webpage Mar. 13, 2013 archive).*

* cited by examiner

Student Functionality-Based User Interfaces

Number of new items or Interpreted Content files available to view

My Notifications ②
Submit Request
My History
My Preferences
Leave Feedback
Contact Us

FIG. 2A

| My Notifications | | |
|---|---|---|
| Date | Title | Interpreter ID |
| | [LINK] | |
| | | |
| | | |
| | | |

FIG. 2B

*when user 202a is finished playing on an Interpreted Content item, user 202a can select to delete or save the item. Saved items will be displayed in "My History" UI.

| My History | | |
|---|---|---|
| Request # | Title | Interpreter |
| | | |
| | | |
| | | |
| | | |

FIG. 2C

Project Menu

Default Language: ASL

Preferred Interpreters:
| 1 | male | |
| 2 | | |
| 3 | | |

Auto Delete: [time period dropdown menu]

Save Preferences

Submit Request — 256

Name: — 262
Desired Completion Date:
Description: — 264
Original Language: — 258
Desired Language: — 260
Verification: no — 268
Preference: ∨ — 266
File: < SELECT FILE > — 252
or
Link URL:

SUBMIT  254

FIG. 2E

Register Device — 350

Name: [ ]
Affiliation: [None ▾]
Interpreter ID: [ ]
Status: [Verification Specialist ▾] — 352

[REGISTER]

FIG. 3A

Project Menu — 360

361b — Requests (open)  (12) — 361a
362 — My History
364 — My Account
366b — My Feedback  (1) — 366a
368 — Invoices/Billing
369 — Project Queue

FIG. 3B

Project Queue — 380

| Request # | Title  | Due Date   |
|-----------|--------|------------|
| 0101      | [LINK] | 10/10/2014 |
| 0134      | [LINK] | 12/10/2014 |

Request #0101 — 370

Requesting User: John Doe
Title: Intro to Science Slideshow 9/14
Description: PowerPoint presentation with voiceover
Due Date: 10/10/2014
Verification Requested: [no]

372 — Accept/Record | Decline — 374

FIG. 3D

| My Account | | EDIT |
|---|---|---|
| Name: | | |
| Education: | B.S. ▾ | |
| SM Specialty: | | |
| Certification: | ▾ | |
| ADD | | |
| Years Experience: | | |
| Bank Account [LINK] | | |
| CANCEL | SAVE CHANGES | |

FIG. 3G

| Invoices/Billing | | |
|---|---|---|
| Request # | Charged | Off |
| ☐ 0101 | 2 hr | 0.5 hrs |
| ☐ 0134 | 0.5 hrs | 0 |
| | | |
| | | |
| | | |
| SUBMIT | | |

FIG. 3I

| My Feedback |
|---|
| Request # 0101 |
| Requesting User: |
| Date: |
| Feedback: |
| [text] |

FIG. 3H

User Registration

Name: 
Affiliation: None
Access Code: 
User ID: 
User Password: 
User Category: Interpreter

REGISTER

FIG. 3K

Requests　⑩

Completed Projects

Invoices/Billing

Appointments

Payments

FIG. 3J

SYSTEMS AND METHODS FOR PROVIDING COMMUNICATION SERVICES

PRIORITY

This application is related to and claims the priority benefit of: (a) U.S. Provisional Application Ser. No. 61/948,024 to Robinson, filed May 20, 2014; and (b) U.S. Provisional Application Ser. No. 62/083,844 to Robinson, filed Nov. 24, 2014. The contents of each of the aforementioned applications are hereby expressly incorporated by reference in their entireties into this disclosure.

BACKGROUND

While the primary and official language in the United States is English, many students in the United States' educational system cannot efficiently communicate in spoken English, whether because they are fluent in another language or because they are Deaf or Hard-of-Hearing. For obvious reasons, it is critical that such students have the ability to receive information from and/or communicate with an instructor or other educational provider. Students who have difficulty understanding the English language and/or hearing may miss information when new concepts and vocabulary are introduced, when group discussions become faster-paced, or when they are positioned a substantial distance from the speaker. This is true not only with respect to classroom or live lectures, but also in the context of slideshow and other presentations with voice-over or otherwise audile narration.

In short, these students are excluded to varying degrees from obtaining the full educational benefits afforded to their English-speaking and/or hearing counterparts. The costs associated with excluding these students from access to information are significant in terms of not only such students' unrealized potential, but also in terms of legal liabilities including discrimination and, at least with respect to Deaf and Hard-of-Hearing individuals, compliance with the Americans with Disabilities Act.

Conventionally, a variety of methods have been employed in an attempt to provide such students with reasonable access to course curriculum. Primarily, hand-held and PC-based devices are available that use translation software to convert text from one language to another. However, these devices are often difficult to use, inaccurate, and only able to process written information. Moreover, such conventional computer-based translation services are extremely impersonal.

Other accommodation methods include Closed Captioning, known as CC, as well as Transcription for audio components in the classroom. While these types of services are successful at conveying content, they fall short in providing access to the information when there is a time constraint associated with the accommodation request. When a CC or Transcription accommodation request is made, but the university is unable to provide the request in a timely manner due to the backlog of requests, the Deaf and Hard-of-Hearing students find themselves at a disadvantage in the educational environment once again.

The limitations of hand-held and PC-based devices are especially problematic for interpreting audio content to sign language (e.g., American Sign Language (ASL)) because sign language is a visual language that employs hand gestures, body language, and facial expressions to convey words and grammar rather than using sound for meaning as do spoken languages. Additionally, sign language is a body-oriented language and every person's body gestures are different as they make the movements that comprise a "word meaning" in sign language.

At least with respect to Deaf and Hard-of-Hearing students, these issues have been at least partially addressed by providing a live interpreter at the facility to assist with the provision of the general educational curriculum. However, similar to the aforementioned hand-held and PC-based devices, there are numerous challenges associated with this approach and, unfortunately, it is not uncommon for Deaf or Hard-of-Hearing students to have limited access to the course curriculum and related materials. Primarily, the quality of educational interpreting is a critical aspect that is inextricably linked to the academic outcomes of Deaf and Hard-of-Hearing students who use interpreters. Indeed, providing a quality interpretation plays a critical role in the student's academic success. Many factors affect the quality of interpretation provided. In addition to having a firm knowledge of the languages involved and the ability to interpret in a fast-paced setting, educational interpreters must also have a combination of interpreting performance skills, a knowledge of education, and—at least with respect to grades K-12—a sufficient knowledge of child development across the relevant age span.

Furthermore, with conventional applications, an educational interpreter must also have an appropriate knowledge of the underlying subject matter to be conveyed. For example, in vocal and sign languages, various vocabularies exist within different professional and/or subject matter areas. To be successful and effective, an educational interpreter must be familiar with and proficient in the vocabulary of a particular subject matter in which they are working—for instance, have a certain degree of familiarity with medical, legal, scientific, or other specialized vocabulary—such that they can effectively convey the appropriate meaning to the students. However, qualified educational interpreters may be difficult to come by, especially when the interpreter must be physically present within a classroom. Educational institutions are limited to using those interpreters located within commutable distance of the relevant campus, as well as the ones who are able to reach the campus at the specific times the classes are being offered. Additionally, and especially with respect to employing qualified interpreters, providing live interpretation in a classroom setting is cost-prohibitive. As Deaf and Hard-of-Hearing students are typically in the minority, it often not financially feasible for an educational institution to consistently provide live access to an educational interpreter. Accordingly, although live interpreting is advantageous, it fails to resolve the basic problems that exist with respect to providing equal access to course materials and information—namely, providing a quality interpretation in a cost-efficient manner.

Another conventional approach to providing interpretation services for Deaf and Hard-of-Hearing individuals is through use of real-time video conferencing. Such services are typically billed by the minute and require specialized videoconferencing equipment. Accordingly, the system does not lend itself to use in an educational environment where lectures typically last anywhere from between thirty minutes to upwards of an hour and are often provided in facilities that do not have computers or an Internet connection, much less specialized videoconferencing equipment. As such, this system has not proven to be cost-effective, nor is it widely available in educational settings.

Additionally, such video conferencing systems are limited to support real-time, two-way communication between the speaker and the Deaf or Hard-of-Hearing individual via an interpreter. In contrast, academic presentations having an aural component are typically delivered either by way of one-way communication (e.g., with an individual lecturing or as a slideshow accompanied by aural voice-over narration) or multi-way communication (e.g., a teacher engaging multiple students in a question/answer format). Two-way video conferencing systems are simply not designed for use under such circumstances. For example, due to the rapid nature of most lectures and/or the quick dialogue between classmates and/or student and teacher, real-time interpretation/translation would be cumbersome, likely be quick to fall behind the flow of speech or dialogue, and not be one hundred percent accurate—especially where the subject matter of the lecture and/or academic dialogue is specialized. This is true not only for ASL interpretation services, but also with respect to the interpretation of such aural presentations between spoken languages. Accordingly, the video conferencing systems and video relay services conventionally available are not capable of providing non-fluent or Deaf and Hard-of-Hearing students with sufficient access to the academic information provided to their hearing counterparts and/or those fluent in the delivery language.

Further exacerbating the problem of providing equal access to students who are unable to communicate effectively in the delivery language and/or understand aurally delivered materials, in recent decades, a significant shift has been seen from classroom-based education towards computer-based curriculum delivery. The advent of networked computers and communications, as well as the availability of electronic networks such as the Internet, has enabled students and educators to supplement—and in some cases entirely replace—curriculum delivered in a physical classroom setting with the exchange of information through online-based lectures, presentations, question and answer interaction sessions, and other related online modalities. While, as previously noted, interpreters can be a conduit for information flow in a classroom setting, there is as yet no workable solution with respect to providing those students who are Deaf and/or Hard-of-Hearing or not fluent in the delivery language with equal access to online curriculum delivered aurally. For example, PowerPoint or other presentations that are made available to students over a course and/or learning management system are not entirely accessible to Deaf and Hard-of-Hearing students—or students who do not understand the delivery language—where such presentations are accompanied by an aural voice-over narration component.

Accordingly, systems and methods are needed that are capable of providing Deaf and Hard-of-Hearing students, and those students who are not fluent in the delivery language, with equal access to educational course materials in an accurate and accessible manner. Ideally, such systems and methods should be cost-effective and easily executable by educational institutions such that they can be interfaced with any existing or legacy network-based systems that students access to obtain various types of information (e.g., class schedules, curriculum, class assignments, etc.).

BRIEF SUMMARY

The present disclosure provides novel systems and methods for the provision of network-based communication services. For example, an integrated computer-aided communication and course management system is provided. In at least one exemplary embodiment of the present disclosure, such an integrated computer-aided communication and course management system comprises a platform connected to a network and a learning management system connected to the network, wherein the platform is integrated with the learning management system such that one or more of the users of the learning management system can submit a request for language conversion and prerecorded content to the platform through a first interface of the learning management system and a resulting converted response is accessible by one or more of the second set of users through the learning management system.

Perhaps more specifically, in at least one embodiment, the platform of the integrated system comprises memory coupled with at least one server, the at least one server connected to a network and comprising at least one application capable of interacting with data stored at least partially in the memory of the platform. Additionally, the platform is configured to: receive, on the at least one server, a request for language conversion, the request associated with prerecorded content to be converted; transmit the request for language conversion to a first set of users over the network; receive, on the server, acceptance of the request from one of the users of the first set; provide the prerecorded content to the accepting user of the first set; receive, on the server, a converted response that corresponds with an interpretation or translation of the prerecorded content; and provide the converted response to a second set of one or more users. Furthermore, in at least one embodiment, the learning management system of the integrated system is accessible through one or more interfaces and configured to provide a networked environment for the administration and delivery of online education courses and/or training programs. In at least one exemplary embodiment of the present disclosure, the platform may be integrated with the learning management system such that the one or more users of the second set can access the converted response through a second interface of the learning management system.

In another embodiment, the platform of the integrated system may be further configured to: provide the converted response to a second user of the first set for verification of the accuracy of the converted response; receive the verified converted response from the second user of the first set; and provide the verified converted response to one or more users of the second set. In such cases, the platform may be additionally configured to transmit a request for quality verification to a subset of users of the first set, the subset of users designated to provide verification services. There, the second user of the first set comprises a user of the subset.

The prerecorded content referenced in the system may comprise audible, visual, multimedia, or any other type of information. In at least one exemplary embodiment, the prerecorded content comprises audible information in English and the converted response comprises at least corresponding visual information in American Sign Language. Additionally or alternatively, the prerecorded content may comprise at least audible content in a first language and/or the converted response may comprise at least visual or audible content performed by the accepting user in a second language.

In yet another embodiment, the converted response is performed and recorded by the accepting user of the first set using a workstation comprising a webcam and at least one component configured to transmit a signal of the prerecorded content to the accepting user. In another embodiment of the integrated system of the present disclosure, each of the one or more users of the first set may be assigned a designated period of time during which such user is to be available, via the server, to receive and respond to a request for language conversion.

Still further, the integrated system of the present disclosure may further comprise a third party processing system configured to interface with the server of the platform and receive and process payment in exchange for the converted responses.

Methods for facilitation communication services over a network are also provided. In at least one exemplary embodiment of the present disclosure, a method for facilitating communication services over a network comprises the steps of: receiving, on a server, a request for language conversion, the request associated with prerecorded content to be converted; transmitting the request for language conversion to a first set of users over a network; receiving, on the server, acceptance of the request from one of the users of the first set; providing the prerecorded content to the accepting user of the first set; receiving, on the server, a converted response that corresponds with an interpretation or translation of the prerecorded content from a first language to a second language; and making the response available to a second set of one or more users via the server. Additionally or alternatively, the server of the method may be integrated with a learning management or course management system such that the server is accessible therethrough.

Certain embodiments of the foregoing method may additionally comprise the step of verifying the accuracy of the converted response. In at least one of such embodiments, the step of verifying the accuracy of the converted response may further comprise the steps of: transmitting, over the server, a verification request to a one or more users designated to provide designation services; and receiving, on the server, a verified converted response prepared by one of the designated users, the verified converted response corresponding with the converted response, but further reviewed for quality purposes. Additionally or alternatively, methods comprising the verification services may further comprise the step of: converting, on a remote workstation, the prerecorded content from the first language to the second language and affixing the resulting converted content in a tangible medium; wherein the step of converting the prerecorded content is performed by the accepting user of the first set and further comprises starting and stopping the playback of the prerecorded content to ensure the accuracy and quality of the resulting converted response.

The prerecorded content of the methods of the present disclosure may comprise at least audible content performed in the first language and the converted response may comprise a recording of at least visual content performed by the accepting user of the first set in the second language. For example, and without limitation, the converted response may be performed and recorded by the accepting user of the first set using a workstation comprising a webcam and at least one component configured to transmit a signal of the prerecorded content to the accepting user.

Additional systems for providing computer-aided communication services are provided herein. In at least one exemplary embodiment of a system for providing computer-aided communication services, the system comprises: a means for receiving a request for language conversion, the request associated with prerecorded content to be converted; a means for transmitting the request for interpretation services to a first set of one or more users over a network; a means for receiving acceptance of the conversion request from at least one of the users of the first set; a means for providing the prerecorded content to be converted to the accepting user of the first set; a means for receiving a converted response that corresponds with an interpretation or translation of the prerecorded content from a first language to a second language; and a means for providing the converted response to a second set of one or more users of the system. Optionally, the system may further comprise a learning management system accessible by at least the second set of users through one or more interfaces. There, the learning management system comprises a means for providing an environment for the administration and delivery of online education courses and/or training programs, wherein the learning management system is interfaced with at least the means for transmitting the request for language conversion services and the means for receiving a converted response that corresponds with an interpretation or translation of the prerecorded content. Still further, the systems provided herein may additionally comprise a means for verifying the accuracy of the conversion response.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIGS. 2A-2E show exemplary embodiments of user interfaces that may be used with the communication system of FIG. 1 according to an exemplary embodiment of the present disclosure;

FIGS. 3A-3K show exemplary embodiments of user interfaces that may be used with the communication system of FIG. 1 according to exemplary embodiments of the present disclosure;

Figure 1:
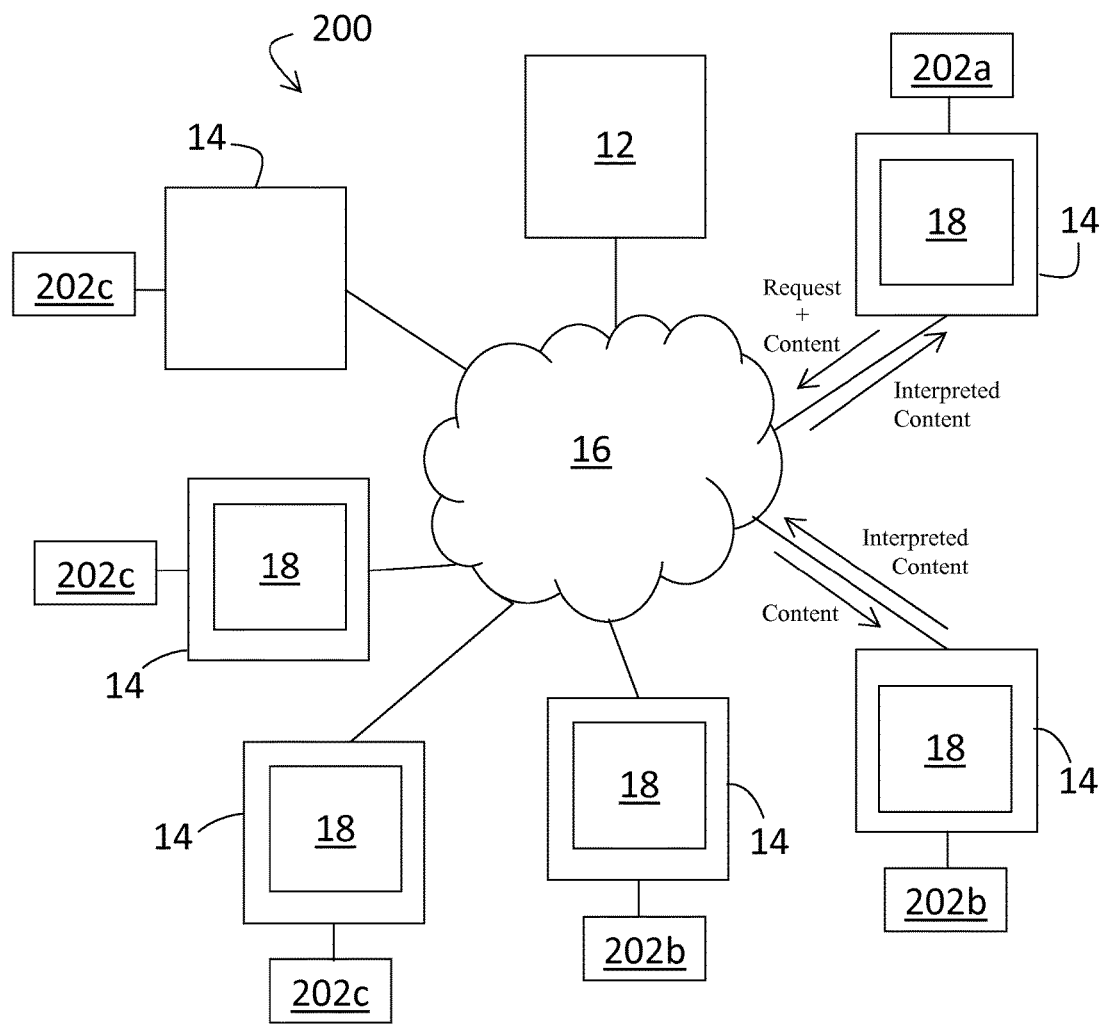
FIG. 1 shows a schematic/block diagram of a communication system, according to an exemplary embodiment of the present disclosure.

An overview of the features, functions and/or configurations of the components depicted in the various figures will now be presented. It should be appreciated that not all of the features of the components of the figures are necessarily described. Some of these non-discussed features, as well as discussed features, are inherent from the figures themselves.

Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is intended, with any additional alterations and modifications and further applications of the principles of this disclosure being contemplated hereby as would normally occur to one skilled in the art. This disclosure is intended to cover alternatives, modifications, and equivalents as may be included within the spirit and scope of this application as defined by the appended claims. While this technology may be illustrated and described in a preferred embodiment, the systems and methods hereof may comprise many different configurations, forms, materials, and accessories.

For example, the systems, methods and techniques of the present application will be described in the context of an academic networking model that incorporates a convenient and accurate interpretation functionality to ultimately provide equal access to curriculum for non-fluent and/or Deaf and Hard-of-Hearing students. However, it should be noted that the systems, methods, and techniques of the present application apply in a wide variety of contexts including, but not limited to, all levels of education (including, without limitation, universities as well as the Kindergarten-twelfth grade and other sectors), business and corporate applications (e.g., in connection with compliance applications and/or corporate trainings), nonprofit applications (e.g., providing equal access interpretation services for online sermons published by a church), and entertainment or otherwise educational applications (e.g., podcasts).

In the following description, numerous specific details are set forth in order to provide a thorough understanding of the present disclosure. Particular examples may be implemented without some or all of these specific details. In other instances, well known process operations and/or system configurations have not been described in detail so as to not unnecessarily obscure the present disclosure.

Various techniques and mechanisms of the present disclosure will sometimes describe a connection between two components. Words such as attached, affixed, coupled, connected, and similar terms with their inflectional morphemes are used interchangeably, unless the difference is noted or made otherwise clear from the context. These words and expressions do not necessarily signify direct connections, but include connections through mediate components and devices. It should be noted that a connection between two components does not necessarily mean a direct, unimpeded connection, as a variety of other components may reside between the two components of note. For example, a workstation may be in communication with a server, but it will be appreciated that a variety of bridges and controllers may reside between the workstation and the server. Consequently, a connection does not necessarily mean a direct, unimpeded connection unless otherwise noted.

Furthermore, wherever feasible and convenient, like reference numerals are used in the figures and the description to refer to the same or like parts or steps. The drawings are in a simplified form and not to precise scale.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be kept in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms commonly associated with mental operations performed by a human operator (such as "comparing"). No such capability of a human operator is necessary, or desirable in most cases, in any of the operations described herein which form part of the embodiments of the present application; the operations are machine operations. Indeed, a human operator could not perform the many of the machine operations described herein due to the networking and vast distribution capabilities of the present disclosure.

Useful machines for performing the operations of one or more embodiments hereof include general purpose digital computers, microprocessors, or other similar devices. In all cases the distinction between the method operations in operating a computer and the method of computation itself should be recognized. One or more embodiments of the present disclosure relate to methods and apparatus for operating a computer in processing electrical or other (e.g., mechanical or chemical) physical signals to generate other desired physical manifestations or signals. The computer and systems described herein operate on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of an instruction.

In the following description, several terms which are used frequently have specialized meanings in the present context. The terms "network," "local area network," "LAN," "wide area network," or "WAN" mean two or more computers which are connected in such a manner that messages may be transmitted between the computers. In such computer networks, typically one or more computers operate as a "server," which run one or more applications capable of accepting requests from clients and giving responses accordingly. Servers can run on any computer including dedicated computers, which individually are also often referred to as "the server" and typically comprise—or have access to—large storage devices (such as, for example, hard disk drives) and communication hardware to operate peripheral devices such as printers or modems. Servers can also be configured for cloud computing, which is Internet-based computing where groups of remote servers are networked to allow for centralized data storage. Such cloud computing systems enable users to obtain online access to computer services and/or resources.

Other computers, termed "workstations" or "clients" provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis. A "module" refers to a portion of a computer system and/or software program or application that carries out one or more specific functions and may be used alone or combined with other modules of the same system or program.

The term "Browser" refers to a program which is not necessarily apparent to the user, but which is responsible for transmitting messages between a workstation and the network server and for displaying and interacting with the network user. Browsers are designed to utilize a communications protocol for transmission of text and graphic information over a worldwide network of computers, namely the "World Wide Web" or simply the "Web." Examples of Browsers compatible with one or more embodiments described in the present disclosure include, but are not limited to, the Chrome browser program developed by Google Inc. of Mountain View, Calif. (Chrome is a trademark of Google Inc.), the Safari browser program developed by Apple Inc. of Cupertino, Calif. (Safari is a registered trademark of Apple Inc.), Internet Explorer program developed by Microsoft Corporation (Internet Explorer is a trademark of Microsoft Corporation), the Opera browser program created by Opera Software ASA, the Firefox browser program distributed by the Mozilla Foundation (Firefox is a registered trademark of the Mozilla Foundation), or any other Browsers or like programs currently in use or hereinafter developed. Although the following description details operations in terms of a graphic user interface of a Browser, it will be understood that one or more embodiments disclosed in the present disclosure may be practiced with text based interfaces, voice or visually activated interfaces, or any other interfaces now or hereinafter developed that have many of the functions of a graphic based Browser.

In general, the disclosure of the present application provides novel systems and methods for providing convenient access to communication services such that course and/or training materials, academic lectures and other information having an aural component can be efficiently and accurately interpreted or translated into a desired language and, thus, made accessible to a group of users who were previously afforded less than full access. While the majority of the embodiments herein describe such systems and methods adapted for use in conjunction with Deaf and Hard-of-Hearing individuals and the terms "interpretation," "interpreted" and the like may be used, it will be appreciated that this is merely done for the sake of simplicity and promoting a clear understanding of the disclosed systems, methods and techniques. As such, it is contemplated that the principles of the present disclosure may be applied to the interpretation and/or translation of aural content between any desired languages—whether spoken, visual and/or non-visual—and no limitation is intended by the embodiments presented herein or the use of the terms "interpretation" versus "translation" (or any corresponding derivatives of the two). Indeed, in at least one exemplary embodiment, the communication systems and methods of the present disclosure can be configured to provide multilingual, foreign language translation in addition to (or in lieu of) its applications geared towards Deaf and/or Hard-of-Hearing individuals.

Now referring to the system architecture of the present disclosure, FIG. 1 is a high-level block diagram of a computing environment through which aspects of the presently disclosed communication system and methods may be implemented. As shown in FIG. 1, a communication system 200 of the present disclosure comprises one server 12 and three clients 14 connected by network 16. One or more users 202, such as users or administrators (as described in further detail herein), can access the communication system 200 via the one or more clients 14. Specifically, in at least one embodiment, the system 200 of the present disclosure is configured such that one or more users 202 can access the particular functionality of and/or data stored within the server 12 via a user interface (not shown) and the network 16. The computing environment may be configured similarly to a multi-user site in that numerous parties may register and/or access the server 12 via multiple—and commonly remote—clients 14. The server 12 is operatively coupled with the clients 14 over a network 16 or networking infrastructure. For example and without limitation, the network 16 may be operatively coupled with clients 14 via the Internet, an intranet, or any other connection.

It will be appreciated that only six clients 14 are shown in FIG. 1 in order to simply and clarify the description and no limitation is intended thereby. Indeed, embodiments of the computing environment may have thousands or millions of clients 14 connected to the network 16, for example the Internet. Likewise, while only one server 12 is depicted in FIG. 1, the computing environment may comprise a plurality of servers 12.

The clients 14 may each comprise one or more network accessible devices that are capable of executing one or more applications and/or accessing a web-based system through a Browser. A client 14 may be any type of workstation such as, for example, any type of computer, computing device, or system of a type known in the art such as a personal computer, mainframe computer, workstation, notebook, tablet or laptop computer or device, PDA, mobile telephone or smartphone, wearable, or any other computing or communications device having network interfaces (wireless or otherwise). Additionally, users 202 may operate software 18 on one or more of clients 14 to both send and receive messages and/or data over the network 16 via server 12 and any of its associated communications equipment and software (not shown). Further, clients 14 may each comprise hardware and componentry as would occur to one of skill in the art such as, for example, one or more microprocessors, memory, input/output devices, device controllers, and the like. Clients 14 may also comprise one or more input devices that are operable by a user 202 such as, for example, a keyboard, keypad, pointing device, mouse, touchpad, touchscreen, microphone, camera, webcam and/or any other data entry means, or combination thereof, known in the art or hereinafter developed. Furthermore, client 14 may also comprise visual and/or audio display means for displaying or emitting output. For example, a client 14 may comprise a CRT display, an LCD display, a printer, one or more speakers, and/or any other types of display or output devices known in the art or hereinafter developed. The exact configuration of each client 14 in any particular implementation of a communication system hereof may vary between clients 14 and, as desired, may be left to the discretion of the practitioner.

As shown in FIG. 1, each client 14 is connected to, and/or in communication with, the server 12 via a network 16. The network 16, which provides access to the communication system 200 of the present disclosure and/or the functionality thereof, comprises any means for interconnecting the server 12 and a client 14. In at least one exemplary embodiment, the network 16 comprises the Internet, a global computer network. Alternatively, the network 16 may be selected from a variety of different networks and/or cables including, but not limited to, a commercial telephone network, one or more local area networks, one or more wide area networks, one or more wireless communications networks, coaxial cable(s), fiber optic cable(s), and/or twisted-pair cable(s). Additionally, the network 16 may comprise equivalents of any of the aforementioned, or combinations of two or more types of networks and/or cables.

Furthermore, in at least one embodiment where the server 12 and a client 14 comprise a single computing device operable to perform the functions delegated to both server 12 and a client 14 according to the present disclosure, the network 16 may comprise the hardware and software means interconnecting the server 12 and client 14 within the single computing device. Accordingly, the network 16 may comprise packet-switched facilities (such as the Internet), circuit-switched facilities (such as the public-switched telephone network), radio-based facilities (such as a wireless network), or any other facilities capable of interconnecting a client 14 with the server 12. Additionally, the clients 14 and/or wired/wireless connections may include the appropriate safeguards to ensure that the transmission of data between the server 12 and each client 14 is secure.

It will be appreciated that where the computing environment comprises a plurality of clients 14, such clients 14 need not all comprise the same type of client 14 or be in communication with the network 16 and/or server 12 via the same type of communication link. As such, the computing environment may comprise some clients 14 configured to connect to/communicate with the server 12 via the Internet, for example, while other clients 14 are connected to the server 12 via a wired connection (e.g., a cable).

The communication system of the present disclosure may be implemented through any appropriate application architecture pattern now known or hereinafter developed. In at least one exemplary embodiment, the communication system is delivered through an n-tier architecture in which presentation, application/business logic, and data management functions are logically and/or physically separated. This application architecture pattern provides benefits in the way of increased availability of the system to its users (i.e. reduced downtime), the minimization of the impact of any component failure, and by facilitating disaster recovery. Additionally, third party applications (e.g., a third party payment processor as described herein) may be interfaced with the system and provided to system users without sacrificing data security as such third party applications need not be in direct communication with the data structures of the system.

As previously noted, the communication system of the present disclosure is configured to either be used as a stand-alone system on the one or more server(s) 12 or, alternatively, as a platform that can be integrated with other third-party systems (described in further detail below). In the at least one exemplary embodiment shown in FIG. 2 where an communication system 200 is a stand-alone system, the communication system 200 is configured to provide interpretation services directly to users 202 over network 16. Here, the users 202 of the communication system 200 access the system 200 directly for the purpose of obtaining or delivering interpretation services.

To aid in understanding of the novel concepts presented herein, a brief overview of the communication system 200 and its functionality will now be described, followed by more detailed descriptions of the components thereof. Generally, the systems and methods hereof provide novel techniques—that are unimpeded by geographical constraints—to connect interpreters and individuals in need of interpretation services via a network infrastructure. Accordingly, individuals who need content interpreted can have access to a large pool of interpreter talent. In operation, pre-recorded content having an aural component (hereinafter referred to in this disclosure as the "Content")—whether in video file, audio file or other formats—can be uploaded to the server(s) 12 by a requesting user 202$a$, accessed via the network 16 by one or more interpreter users 202$b$, and interpreted from the original language into the designated language by a selected interpreter user 202$b$ thereby resulting in interpreted content (hereinafter referred to in this disclosure as "Interpreted Content"). In at least one embodiment, the interpreter user 202$b$ uses a webcam or other device comprising video functionality in conjunction with or as part of his or her client 14 to record the interpretation and create the Interpreted Content. Furthermore, the communication system 200 may be configured to automatically and accurately tally the time the interpreter user 202$b$ spends performing the interpretation of the Content and, thus, creating the Interpreted Content. In this manner, an accurate log of the interpreter user's 202$b$ time is created for billing and compensation purposes, or otherwise.

Once complete, the preliminary Interpreted Content is stored (either in a local file on a client 14, in a cloud environment or other database accessible by the server 12, or in any other appropriate storage medium and/or location) and optionally verified for accuracy and/or quality before it is finalized (verification process described in further detail below). After being finalized, the Interpreted Content is uploaded to, linked with, or otherwise made accessible/available to the requesting user 202*a* through the server(s) 12. As such, the requesting user 202*a* can access, view, and use the Interpreted Content as needed.

For example, in at least one embodiment, the requesting user 202*a* can download the Interpreted Content from the server 12 to his or her client 14 such that he or she may thereafter store, play, view, publish or otherwise distribute the Interpreted Content as he or she deems appropriate. Additionally or alternatively, the requesting user 202*a* may access and play the Interpreted Content on the server(s) 12 without downloading the same (either via streaming or through other appropriate means). Accordingly, the system 200 can be configured to store Interpreted Content on the server(s) 12 or in associated databases such that the Integrated Content is accessible by the requesting user 202*a* upon logging into the system 200. Furthermore, pursuant to the requesting user's 202*a* preferences, when the Interpreted Content is stored on the system 200, it may also be made available to any other users 202 of the system 200 who have the appropriate credentials. Accordingly, the stand-alone communication system 200 facilitates the quick access to a plurality of interpreter users 202*b* via the network 16 and thereby allows for the efficient delivery of Interpreted Content to a requesting party 202*a* and any other users designated thereby. Additionally, the system 200 can be configured to invoice and/or receive payment for the interpretation services from the requesting user 202*a*, as well as to compensate the appropriate interpreter user(s) 202*b* for the services performed.

In general and as previously referenced, the communication system 200 supports at least two categories of users 202—requesting users 202*a* and interpreter users 202*b*—that can logon and access the communication system 200 via the client(s) 14. Requesting users 202*a* may comprise any individual or entity that desires to use the communication system 200 to interpret Content. For example, a requesting user 202*a* may be a professor who has Content to be interpreted from spoken English into ASL such that his or her Deaf or Hard-of-Hearing students may access the same. Similarly, a requesting user 202*a* may be a student who needs Content interpreted from one language to another. Alternatively, a requesting user 202*a* may comprise a business entity that needs Content interpreted from spoken English to Spanish (or between any languages) for use in connection with corporate training or compliance activities. Indeed, a requesting user 202*a* may comprise any individual or entity that uses the system 200 to interpret Content from one language to another (whether spoken or otherwise).

Interpreter users 202*b* comprise any individuals who provide interpretation services over the communication system 200. Interpreter users 202*b* need not have any specialization or specific certifications; however, they may be qualified in particular subject matter areas, have certifications, etc., as desired. In at least one embodiment, interpreter users 202*b* can indicate an affiliation with a specific entity, academic institution, school or organization on the system 200, or may simply be independent contractors or consultants without any specific affiliation indicated. While, like other users, the interpreter users 202*b* can log in or out of the system 200 at any time, in at least one embodiment of the systems and methods hereof, multiple interpreter users 202*b* may be designated to be available through the communication system 200 in assigned shifts or blocks of time. In this manner, it can be ensured that a minimum number of interpreter users 202*b* are ready and available to accept interpretation requests over the system 200 at any given time.

An additional classification of users 202 that may optionally be supported by the communication system 200 is recipient users 202*c*. A recipient user 202*c* can be a student, an instructor, an employee or any other individual or entity that accesses the system 200 via a client 14 to receive or otherwise gain access to Interpreted Content (i.e. an individual who is not requesting that Content be interpreted, but accesses the system 200 to obtain/review Interpreted Content). For example, receiving users 202*c* may comprise Deaf or Hard-of-Hearing students that have been instructed by a professor to access and use the communication system 200 in conjunction with a course in which they are enrolled. Perhaps more specifically, an educator may use the communication system 200 to have an aural lecture (i.e. the "Content") interpreted into ASL and instruct his or her Deaf or Hard-of-Hearing students (the receiving users 202*c*) to log into the system 200 and access the Interpreted Content. As previously noted, in at least one embodiment, recipient users 202*c* can each be assigned appropriate credentials to promote the security of the overall system 200, data confidentiality, and/or to ensure recipient users 202*c* can only access certain designated Integrated Content.

Additionally, the system 200 may also support a fourth category of users—the administrators (not shown)—who play an operational or governance role. In at least one embodiment, the system 200 is operated by (or under the control of) one or more administrators, which may be individuals, educational institutes, institutions of higher learning, business entities, and/or representatives of the foregoing. An administrator may have broad security credentials and access permissions that provide it with access to data stored throughout the system 200 (or limited portions thereof); rights to customize components, functionality and/or features of the system 200 itself; the ability to define baseline and other parameters used in prescreening users 202 (if desired); the ability to run and view data analytics based on user 202 activity; and the authority to terminate or suspend a user's 202 account. Furthermore, an administrator may distribute announcements to its user-base or a subset thereof, enable or disable system 200 functionality with respect to all or select users 202, organize Content and Integrated Content, schedule interpreter users 202*b* to be signed-on and available through the system 200, and/or designate interpreter users 202*b* as verification specialists or to other assigned roles. In this manner, large volumes of users 202, Content and Integrated Content may be managed efficiently and effectively.

In at least one embodiment, the system 200 may comprise a plurality of administrators, each of whom are associated with a specific institution. Each of these administrators may be assigned security credentials and access permissions as described above, however, such access and administrative authority is limited to only those parts of the system 200 and users 202 associated with their institution. For example, several universities may have accounts on a single communication system 200, and each university may have one or more administrators who oversee and govern any use of the system 200 by that university's students, professors, etc. However, in furtherance of the security of the system 200, such administrators' rights are limited such that they cannot access or influence users 202 or data of the system 200 that are not associated with their university. For the avoidance of doubt, when the term "user 202" is used herein, it shall mean an individual-user such as a requesting user 202a, an interpreter user 202b, or a recipient user 202c, as opposed to an administrator, unless indicated otherwise.

The communication system 200 is not limited geographically. As such, users 202 from all over the world can participate, if desired, and there are no inherent restrictions as to the number of users 202 who can access and use the communication system 200 at a time. In at least one exemplary embodiment, the communication system 200 is delivered as an open platform environment, where anyone with access to the Internet may register as a user 202 thereof. For example, users 202 can gain access to the communication system 200 and underlying computing environment via a secure login interface as is commonly known in the art (e.g., creating an account, establishing a username and password, etc.). Accordingly, by entering a publicly available website, a user 200 can register and gain access to the functionality provided by the communication system 200. As such, use of the communication system 200 enables the worldwide provision of interpretation services in a convenient, efficient, secure and accurate manner.

In at least one additional embodiment, users 202 may also be required to register their personal devices as clients 14 of the communication system 200 to facilitate identity verification and further ensure system 200 security. One of the effects of device registration is that the server 12 can track any use of the system 200 by a registered device/client 14 and potentially block such use/access if it is deemed unauthorized. Furthermore, upon registration, a user 202 may choose for the device/client 14 not to stay logged into the system 200 and/or to not save the access password. Such registration functionality is especially useful when the clients 14 comprise mobile devices (whether accessing the system 200 through a mobile application or otherwise) because if the mobile device is ever lost or stolen, registration provides a safeguard to prevent unauthorized access to and use of the system 200 and/or any user 202 data stored thereon.

Unlike conventional video conferencing and/or video relay interpretation services, in at least one exemplary embodiment, the communication system 200 does not provide interpretation services on a real-time or near real-time basis. Indeed, Content itself is not "live" content or streaming live media, but rather material that has been previously recorded and made available to the system 200 for interpretation (e.g., a lecture or class discussion that was recorded and stored in a video file format). Additionally, the communication system 200 is configured to interpret one-way communication (i.e. a recording, not a dialogue with the end-user). This is in direct contrast with conventional interpretation services which are configured to capture and interpret two-way communication—or dialogue—between the speaker(s) and the recipient(s) of the interpretation services.

The adaptation of the communication system 200 hereof for use with recorded content provides numerous benefits and additional features that are not otherwise afforded by conventional interpretation strategies. As the communication system 200 is not restricted by the conventional parameters associated with real-time/near real-time recordation and/or two-way communication, the interpreter users' 202b interpretations are based on Content that is pre-recorded and fixed—a significant distinction from a live performance, conversation or dialogue which has an intrinsic rhythm or flow that is out of the interpreter's control. Unlike an interpreter providing services in real- or near real-time, an interpreter user 202b of the communication system 200 has the advantage of starting and stopping the Content as may be necessary or convenient during the interpretation process. As such, the system 200 fosters an interpretation performance that is not immediately time-sensitive, thereby resulting in a clear, accurate, and high quality interpretation. Indeed, should the interpreter user 202b find it necessary to cross-reference or otherwise look-up a particular term or phrase that is present in the Content recording, he or she need only pause the Content. Furthermore, after an interpreter user 202b makes his or her way through the entirety of the Content, they may then go back through the preliminary interpretation to assess and verify the quality of the work. As such, an interpreter user 202b may correct any mistakes or imperfections prior to finalizing and distributing the Interpreted Content. Where it is often critical for conventional systems to use only qualified interpreters (i.e. interpreters having particular certifications or subject matter skill sets), the interpreter users 202b providing their services via the system 200 can take the time they need to ensure their product is accurate and, as such, can obtain a high degree of accuracy and quality even in areas where they may not have a high level of interpretation experience or expertise.

Additionally, as previously noted, the communication system 200 may comprise an independent verification functionality. Where such a feature is desired, one or more interpreter users 202b of the system 200 may be designated to perform interpretation verification and editing services (either in addition to or in lieu of providing interpreting services via the system 200). In at least one exemplary embodiment, a subset of interpreter users 202b may be designated to be responsible for any requested verification services (e.g., identified as "verification specialists"). Additionally or alternatively, some or all of the interpreter users 202b may be subdivided into various teams, with each team having a designated verification specialist.

Such "verification specialists" may have a particular subject matter qualification or certification, be recognized as interpreter users 202b who have established a high rate of accuracy or otherwise consistently provided quality work product, satisfy other criteria defined by a requesting user 202a, or simply have a willingness to act as a "second set of eyes" to review preliminary interpretation results. It will be appreciated that the pricing structure associated with the interpretation services provided by the system 200 may be dependent upon the type of verification services selected and/or the requested qualifications of the verification specialist. For example, use of a verification specialist having expertise in a particular subject matter area may cost more than use of a general interpreter user 202b who is only employed to perform a secondary review the preliminary interpretation results.

In addition to the prerecorded Content-related interpretation/translation functionality of the communication system 200 previously described, the system 200 may be configured to additionally provide conventional real-time or near real-time interpretation/translation and/or video relay services via the network 12 (and, optionally, a telephone or other connection, as desired). In this manner, system 200 users 202 could have the option to choose between which services are preferred in any given circumstance.

In those embodiments where the system 200 is configured to additionally provide "live" interpretation/translation services, the system 200 may further comprise a module configured to support this additional functionality that is configured to interface with both the requesting user's 202a and the interpreter user's 202b workstations and to receive and transmit visual and/or audible data to and from the server 12 (through streaming or otherwise). Accordingly, a student requesting user 202a could request a live interpretation of a lecture through the system 200, use a webcam or other multimedia input device on his or her workstation to capture the lecture and transmit the same to the accepting interpreter user 202b through the server 12 in real- or near real-time. Likewise, the accepting interpreter user 202b could view and/or listen to the lecture via his or her workstation in real- or near real-time and perform an interpretation/translation thereof, which would be received by an input device on the interpreter user's 202b workstation and transmitted through the server 12 to the requesting user's 202a workstation. It will be appreciated that this is only one example of how two-way "live" interpretation can be provided through a network-based system and is not intended to be limiting. Indeed, the optional network-based "live" interpretation/translation feature of the communication system 200 may be configured and implemented in any manner that is now known or hereinafter developed, provided it interfaces with the communication system 200 such that a requesting user 202a can initiate a request for interpretation/translation via accessing the system 200.

In addition to the aforementioned, the communication system 200 may also incorporate additional tool sets and features. Examples of such tools include, but are not limited to, user prescreening, feedback, compensation/invoicing, and communication functionalities.

In at least one embodiment, the server 12 of the interpreting system 200 may comprise one or more applications for prescreening potential users of the system 200. When the communication system 200 includes a prescreening application, potential users are screened subject to a set of established criteria as a condition precedent to being assigned credentials to access the communication system 200. The details and extent of the prescreening can be set by an administrator to achieve a desired result such as restricting a subset of users' 202 ability to use certain system 200 functionalities/tool sets and/or to access certain information stored on the system 200 (e.g., only those individuals enrolled at a specific university can access certain Integrated Content and/or only users 202 who are professors may request an interpretation).

In its simplest form, the prescreening criteria may simply consist of a request that the potential user provide certain information and/or agree to Terms and Conditions related to use of the system 200. Here, after the potential user provides such information (i.e. satisfies the criteria), he/she/it will be granted system 200 access. For example, each potential user may be instructed to provide certain information regarding their university or employment affiliation, and identify their field of interest and whether they desire to use the system 200 as a requesting user 202a, interpreter user 202b, recipient user 202c, or a combination thereof. Additionally, the prescreening criteria may include having a potential user provide valid payment and/or banking information (as appropriate).

Alternatively, the prescreening process and criteria can be more comprehensive than simply requesting information, or a combination of these techniques may be employed. Where a comprehensive prescreening strategy is used, the potential users' responses may be evaluated and measured against a predetermined standard (e.g., a response is evaluated against the standard and either passes or fails, with a certain percentage of passing responses required to gain access to the system 200). For example, an interpreter may have to have a minimum level of experience and/or have acquired certain certifications in order to be granted access to the system 200 as an interpreter user 202b.

All potential users may be evaluated pursuant to the same prescreening criteria or such criteria may be tailored to particular categories of users 202. For example, prescreening criteria for potential interpreter users 202b may be established to ensure that each interpreter user 202b of the system 200 has satisfied a minimum standard of experience with the resulting benefit being that the quality of interpreter users 202b (and, thus, interpretation services) on the system 200 is controlled. Such interpreter user 202b prescreening criteria may include (without limitation) whether or not the individual has more than a minimum number of years of experience, that the individual has one or more certifications, that the individual is fluent in certain languages, and/or that the individual has certain insurance policy coverages. Accordingly, requesting and recipient users 202a, 202c can be certain they are receiving quality Interpreted Content and/or a particular standard of service via the interpreting system 200.

In addition to the prescreening applications, the server(s) 12 of the system 200 may also or alternatively comprise a feedback module. In at least one embodiment, the feedback module provides a mechanism for requesting and/or recipient users 202a, 202c (as applicable) to evaluate the services provided by an interpreter user 202b in connection with specific Interpreted Content. The requesting and recipient users 202a, 202c are able to submit any issue, question or other feedback directly to the interpreter user 202b such that the same can be quickly and efficiently addressed, if needed. Furthermore, in at least one embodiment, the feedback submitted can be analyzed and associated with the respective interpreter user's 202b profile (e.g., displayed either through a prescribed rating scale or otherwise). In this manner, user feedback can be employed to evaluate the interpreter users' 202b skills and/or customer service efforts. Where such data is made generally available to the users 202 of the system 200, it can be used to not only assist other requesting users 202a with selecting a particular interpreter user 202b to provide interpretation services via the system 200, but may also be used by the interpreter users 202b to, for example, justify higher compensation rates.

An additional feature of the communication system 200 may comprise an automated billing and compensation functionality. This feature automates the process for providing invoices to requesting users 202a who have received interpretation services through the system 200, as well as compensating interpreter users 202b who have provided services through the system 200. In at least one embodiment, the automated billing and compensation functionality may be run and/or managed by a third party payment processor that is interfaced with the system 200.

As previously noted, the communication system 200 is capable of automatically tallying the amount of time an interpreter user 202b spends creating the Interpreted Content. In at least one embodiment, the automated billing and compensation functionality of the communication system 200 is configured to interact with such tally, calculate a bill therefrom (based, at least in part, on a predefined rate established for that interpreter user 202b, for example), and automatically generate an invoice for the appropriate requesting user 202a. Alternatively, the automatic billing and compensation functionality may be configured to simply generate an invoice based on an established flat fee. It will be appreciated that the specific billing parameters and rates is completely customizable and the billing and compensation functionality hereof may be programmed by an administrator or other entity as appropriate to achieve the desired purpose.

Other features of the billing and compensation tool set include automatically submitting an invoice to the requesting user 202a in connection with an interpretation project and/or upon acceptance of Interpreted Content. For example, the invoices could be transmitted through the system 200 to the appropriate requesting user 202a through an internal e-mail, system message, or in any other manner. Further, in at least one embodiment, the system 200 may prompt the requesting user 202a to enter his or her payment information or, if such payment information is already associated with that requesting user's 202a system 200 profile, automatically deduct the invoiced fees from such account.

Depending on administrator preference, the billing and compensation features of the communication system 200 may also be configured to provide direct deposits to an interpreter user's 202b bank account as compensation for the services provided (assuming such interpreter user 202b has stored accurate banking information in his or her system 200 profile). While it has previously been noted that interpreter users 202b may be compensated based on the tallied time associated with interpreting Content, it is also contemplated that other compensation structures may be employed. For example, in at least one embodiment, interpreter users 202b may be compensated on an hourly rate associated with the time they are available on the system 200 (e.g., where interpreter users 202b are available via the system 200 in shifts). There, the billing and compensation feature may be configured to receive logon and/or log-out data from the server 12 associated with such interpreter user 202b and provided compensation pursuant to prescribed rates.

It will be appreciated that the billing and compensation system may be configured to achieve any combination of the aforementioned billing and/or compensation structures and is not limited to the specific examples described herein. Accordingly, the billing and compensation feature of the communication system 200 is fully customizable and can provide a fully automated solution to facilitate easy, accurate and efficient billing and compensation services.

In addition to the foregoing, the communication system 200 may further comprise one or more communication applications for supporting direct communication across the system 200 between two or more users 202. Input from one user 202 may be submitted and/or transmitted through the system 200 in the form of an e-mail, instant message, text transmission, phone transmission, other written/typed correspondence, or any other form of transmission that is now known or hereinafter developed. Accordingly, a first user 202 can contact a second user 202 directly through the system 200. Such functionality may be employed in connection with the other tool sets described herein, such as without limitation: a) providing the interpretation services (e.g., an interpreter user 202b communicating directly with a requesting user 202a regarding the project); b) verifying the accuracy of preliminary Integrated Content (e.g., a verification specialist interpreter user 202b communicating with the interpreter user 202b who performed the interpretation to verify the accuracy of the Content); c) providing an evaluation through the feedback module (e.g., a requesting user 202a or recipient user 202c transmitting feedback to the interpreter user 202b); or d) any other application of the system 200 that may necessitate or otherwise employ communication between users 202.

Now addressing a user's 202 ability to access the functionality of the system 200, the users 202 interact with the system 200 through one or more user interfaces. Depending on the desired configuration and implementation of the system 200, the user interface may be local to a client 14, provided over the network 16, or stored within the server 12 or related database. In at least one embodiment, the user interface comprises a web-based portal that provides functionality for accessing and displaying data stored within the server 12. In at least one exemplary embodiment, the user interface comprises a mobile application and/or widget designed to run on smartphones, tablet computers, wearables, and other mobile devices. In all cases, the user interface facilitates a user's 202 input into and access to the functionality of the system 200 and/or data stored within the server 12 and may comprise any configuration or design that is appropriate to achieve such purposes.

The user interfaces of the system 200 are fully customizable. For example, the display and content of the user interfaces may be customized for particular categories of users 202 such that the communication system 200 can provide standardized interfaces with features and functionality specifically tailored to its different types of users' 202 needs. See, for example, FIGS. 2A-2E that illustrate various user interface designs for use on a mobile device that are configured for use by a requesting user 202a, FIGS. 3A-3J that illustrate various user interface designs for use on a mobile device that are configured for use by an interpreter user 202b, and FIG. 3K that illustrates a user interface design for use by any potential user upon their initial registration with the communication system 200.

Additionally, the display and content of the user interfaces may be customized for particular classes of users 202c, such as Deaf or Hard-of-Hearing students. For example, in at least one embodiment, in addition to providing interpretation services and related content to users, targeted content, such as special resource opportunities, user-specific tips, etc.) may be made available through the system 200 to particular classes of students as may be appropriate.

It will be appreciated that while the examples of user interfaces provided herein comprise specific fields, drop-down menus, buttons and other graphical control elements, the user interfaces of the communication system 200 may be configured in any manner desired, customized pursuant to the particular functionalities provided by the system 200, and/or to request various types of information as appropriate from the various users 202 in light of their intended use of the system 200. Indeed, the embodiments illustrated in FIGS. 2A-3K are provided merely by way of explanatory example and are not intended to be limiting in any way.

Now referring to FIG. 3K, in an exemplary embodiment of the communication system 200, an individual must provide certain registration information and create an account as a condition precedent to accessing the system 200. The required information may include, without limitation, the potential user's name, address, other contact information, and/or any institution affiliation that might influence his or her use of the system 200. Potential users may also be required to provide information relating to their desired use of the system 200. Perhaps more specifically, a potential user may be prompted to indicate if he or she desires to use the communication system 200 as an interpreter user 202b or as a requesting and/or recipient user 202a, 202c. Accordingly, FIG. 3K illustrates at least one embodiment of a user registration interface configured to ascertain this type of information in connection with establishing a new user account.

Now referring to FIGS. 2A-2E, user category-specific interfaces and functionalities of the system 200 will now be described. As can be seen in the examples set forth in FIGS. 2A-2E, the user interfaces customized for use with a requesting user 202a may be designed to solicit data from the requesting user 202a that relates to any interpretation projects that may be requested. For example, the user interface of FIG. 2D enables the user 202a to establish a default language, interpretation preferences (e.g., male interpreter, desired certifications, desired subject matter specialties, etc.), default time periods with respect to how long viewed projects will be accessible within the system 200, etc. Other user interfaces customized for use with a requesting user 202a may include a home page similar to the embodiments shown in FIGS. 2A and 3K, which provide easy access to the various functionalities of the system 200, a notification page (see FIG. 2B) for listing and providing access to all completed interpretation projects (i.e. Interpreted Content) that have not yet been viewed and/or saved by the user 202a, a requests page (see FIG. 3J) for indicating the number of, and listing all, open/unaccepted requests a user 202a has submitted to the system 200 for interpretation, a history page (see FIG. 2C) for listing and providing access to all Interpreted Content that has been previously played and stored for later access, and a interpretation request page (see FIG. 2E) for requesting interpretation services via the communication system 200.

Now referring to FIG. 2E, at least one embodiment of a user interface for use in requesting interpretation services via the communication system 200 is depicted. Primarily, the request interface 250 is configured such that the Content may be uploaded to the server 12 of the system 200 (see field 252). Additionally or alternatively, the request interface 250 may also provide a field for receiving a hyperlink or other means for accessing the Content over the network 16 (see field 254).

The request interface 250 may also be configured to collect certain information from the requesting user 202a regarding the particular interpretation project. For example and without limitation, the request interface 250 may be configured to collect a) requesting user 202a information (e.g., name field 256, contact information (not shown), etc.), b) content-specific information (e.g., subject matter area dropdown menu (not shown), original language dropdown menu 258, desired language dropdown menu 260, etc.), and/or c) project-specific information (e.g., requested completion date field 262, general description field 264, compensation information (not shown), etc.). Additionally, the request interface 250 may comprise one or more text fields in which the requesting user 202a can enter any other information regarding the project (not shown) and/or, in at least one exemplary embodiment, a graphical control element for indicating a preference for one or more specific interpreters. For example, a requesting user 202a could be prompted to enter/select either the desired interpreter's name or system ID number (see preference dropdown menu 266). Still further, in at least one embodiment, the request interface 250 comprises a toggle button or other element that indication of preference with respect to adding verification services to the project (see verification toggle button 268).

Figures 3E, 3F:
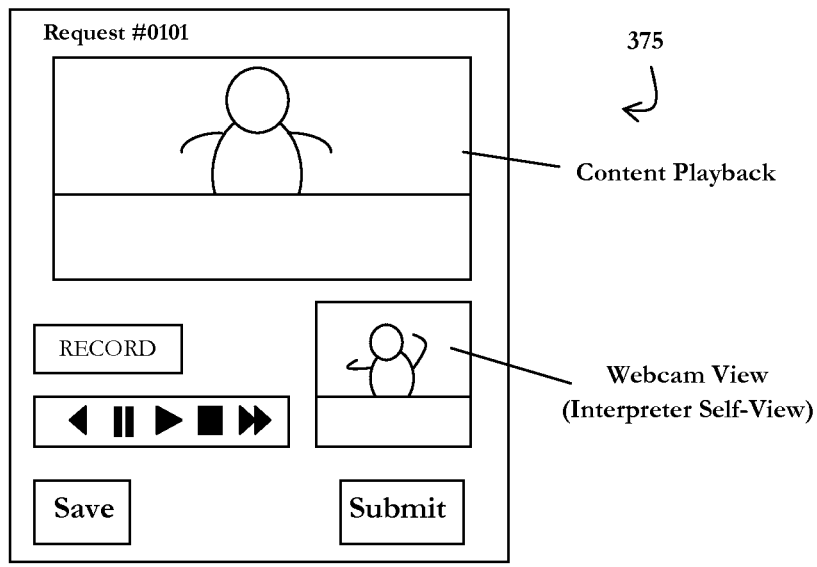

Now referring to FIGS. 3A-3J, similar to the embodiments of user interfaces shown in FIGS. 2A-2E, user interfaces may also be customized for use with interpreter users 202b. FIG. 3A illustrates at least one embodiment of a device registration interface 350 for use with an interpreter user 202b registering their mobile device as a client 14 with the communication system 200. Device registration interface 350 may optionally include a status field 352 for indicating any particular interpreter status—verification specialist, for example—an interpreter may hold in connection with the system 200. Depending on administrator preference and/or the various functionalities of the system 200 that are utilized, indication of a particular status may associate certain security credentials and/or access permissions with the mobile device at issue, thereby enabling additional functionality and/or accessibility permissions for the device. For example, and without limitation, where a device is registered as belonging to an interpreter user 202b who is a verification specialist, the device may be authorized to access and/or edit other interpreter users' 202b Integrated Content via the system 200.

Additional interpreter user 202b-related interfaces may include those geared towards receiving interpretation requests and performing interpretation services. The project menu interface 360 of FIG. 3B illustrates one example of a menu that may be used to clearly display to an interpreter user 202b the number of interpretation requests he or she has accepted and that are not yet completed (indicator 361a), as well as enable easy access thereto (hyperlink 361b) (in at least one exemplary embodiment, the hyperlink 361b links to a list of all pending requests that are currently available to the interpreter user 202b (not shown)). The project menu interface 360 may also provide convenient links to a variety of other content available on the communication system 200 including, without limitation, a list of accepted but unfinished projects (e.g., hyperlink 369, which directs to a project queue interface 380 shown in FIG. 3C), a list of completed projects (e.g., hyperlink 362, which directs to the history interface 363 of FIG. 3F); the interpreting user's 202b background data and other account information (e.g., hyperlink 364, which directs to an account interface 365 of FIG. 3G); questions, comments, evaluations and/or feedback submitted by other users 202 (e.g., indicator 366a and hyperlink 366b, which directs to the feedback interface 367 of FIG. 3H); and invoicing and/or billing information (e.g., hyperlink 368, which directs to billing interface 369 of FIG. 3I).

As noted above, the interpreter user 202b-related interfaces may also include a set of interfaces designed to facilitate the acceptance and performance of interpretation services on the communication system 200. For example, the system 200 comprises one or more interfaces configured to list active projects and detail regarding the same; provide easily-accessible links to the relevant Content; enable an interpreter user 202b to view the Content while concurrently performing and recording an interpretation thereof; and upload or otherwise make the resulting Interpreted Content available via the interpreted system 200.

FIGS. 3D and 3E display examples of a request interface 370 and an interpretation interface 375 that accomplish at least some of these objectives. In the embodiment depicted in FIG. 3D, the request interface 370 is associated with a single interpretation request (identified as "Request #0101) and provides detailed information regarding the specific project. An interpreter user 202b can decide whether to accept or decline the project (using, for example, the accept/record button 372 or decline button 374, respectively). In the event the interpreter user 202b accepts the interpretation request, the communication system 200 automatically records that the project has been accepted, thereby making the interpretation request unavailable to all other interpreter users 202b of the system 200. Additionally, upon accepting a interpretation request, the Content associated with that project is made available to the appropriate interpreter user 202b via the system 200. For example, upon acceptance, the relevant request is added to the interpreter user's 202b list of pending/open projects (see the project queue interface 380 of FIG. 3C) and a link is provided such that the interpreter user 202b can directly access/view/listen to the relevant Content (see link 382 of FIG. 3C).

In at least one embodiment, the interpreter user 202b can access the Content via the link provided upon acceptance of the project, and record his or her interpretation performance on a webcam or other video device associated with the client 14. Alternatively, the interpretation performance may be recorded on an independent device and subsequently transferred to the client 14 such that the Interpreted Content can be uploaded to, or linked with, the communication system 200. As shown in FIG. 3E, in at least one exemplary embodiment, both Content playback and recordation of the interpretation performance can be achieved via the same interpretation interface 375. Perhaps more specifically, the interpreter user 202b may use the interpretation interface 375 to view the Content and record, edit and submit/save the Interpreted Content. It will be noted that while the Content is shown in FIG. 3E as being displayed in the larger view screen of the interpretation interface 375, an interpreter user 202b may choose to view the Interpreted Content in the larger screen such as, for example, when reviewing or editing the same.

In operation, an interpreter user 202b opens his project menu interface 360 to access and view any available interpretation requests. In the exemplary embodiment of FIG. 3B, the interpreter user 202b has twelve pending interpretation requests, as indicated by indicator 361a. The interpreter user 202b may access the available interpretation requests and obtain additional information about each via hyperlink 361b, as desired.

In at least one exemplary embodiment, where an interpreter user 202b desires to access additional detail regarding a specific available interpretation request (Request #0101, for example), the interpreter user 202b simply clicks on the appropriate link displayed in a list of all pending requests that are currently available to the interpreter user 202b (not shown). Such link directs the interpreter user 202b to a detailed description of that specific interpretation request (see the request interface 370 of FIG. 3D). Furthermore, in at least one exemplary embodiment, the detailed description of the interpretation request may additionally comprise a means through which the interpreter user 202b can accept (via, for example, the accept/record button 372) or decline the project (via the decline button 374, for example). Additionally or alternatively, and as described in further detail herein, an interpreter user 202b may be directed to such detailed request information via a Request Message.

Where an interpreter user 202b declines a project, the interpretation request remains active on the system 200—in other words, it continues to be available to all other interpreter users 202b who are eligible to accept the same. However, where an interpreter user 202b accepts a project, the communication system 200 automatically records that project as accepted and informs any subsequent interpreter user 202b who indicates interest in the project that the request has been filled. In at least one embodiment, the system 200 assigns requests on a first-come first-serve basis such that a project is assigned to the first eligible interpreter user 202b who indicates acceptance of the project.

After an interpreter user 202b accepts the interpretation request, as previously noted, the Content is made available to that interpreter user 202b via the communication system 200. In at least one exemplary embodiment, the interpreter user 202b views the Content via interpretation interface 375. Additionally or alternatively, the interpreter user 202b can use the interpretation interface 375 to record an interpretation of the Content, thereby resulting in Interpreted Content, which can either be saved to the system 200 for further review (by a verification specialist or otherwise), or finalized and submitted such that it is made available to the requesting user 202a and/or any identified recipient users 202c.

As previously noted, due to the unique configuration of the communication system 200, an interpreter user 202b can play, rewind, fast-forward, stop and pause both the Content and interpretation recording while he or she is in the process of preparing the Interpreted Content. As illustrated in FIG. 3E, the interpretation interface 375 provides controls for performing all of these functions. Additionally, the interpretation interface 375 comprises one or more view screens through which an interpreter user 202b can view the Content and/or their interpretation/Interpreted Content. As illustrated in the at least one exemplary embodiment of FIG. 3E, the interpretation interface 375 may have one or more view screens such that an interpreter user 202b may easily access and play the Content and/or Interpreted Content. Likewise, where the interpretation interface 375 comprises more than one view screen, an interpreter user 202b can simultaneously view the Content and themselves in real-time as they perform the interpretation and/or play back both the Content and the recorded Interpreted Content simultaneously to verify the quality of their work.

Furthermore, in at least one embodiment, the communication system 200 may additionally comprise a rescind feature that enables an interpreter user 202b to rescind or withdraw his or her prior acceptance of a project (e.g., through a rescind button present on the interpretation interface 375 (not shown)). Consider, for example, where an interpreter user 202b accepts a project request, but subsequently recognizes that the project is outside of the scope of their interpretation ability (either due to the subject matter, sensitivity of the information, prior obligations, etc.). Where the communication system 200 comprises the rescind feature, the interpreter user 202b can rescind their prior acceptance of a project and, as such, submit the interpretation request back to the request queue. In this manner, the system 200 can re-activate/reopen the request and thus make it available to all other eligible interpreter users 202b for acceptance. Additionally, the system 200 will track any such rescission of acceptance and, depending on administrator/user preferences, notify the appropriate parties (e.g., the appropriate administrator(s) and/or the requesting user 202a) of the request's status change.

The rescind feature may be configured to prompt the rescinding interpreter user 202b to provide information as to the reasoning behind their rescission of their previous acceptance. In at least one such embodiment, an interpreter user 202b is required to submit information as to their withdrawal from the project prior to the system 200 processing the rescission and removing the previously accepted project request from the interpreter user's 202b project queue. The provided information may be associated with the project and distributed in connection with the re-activated project request, simply sent to an administrator or the appropriate requesting user 202a, and/or stored on the system 200. In this manner, other interpreter users 202b can potentially utilize the information in determining whether or not to accept an interpretation request and in establishing their compensation rates, if applicable. Accordingly, the communication system 200 hereof provides an easy-to-use and convenient system through which interpreters can market their skills, establish a clientele base, acquire new work, and provide quality interpretation services to a vast network of clientele.

The advent of networked computers and communications, as well as the availability of electronic networks such as the Internet, has enabled students and educators to augment—and in some cases even entirely replace—curriculum delivered in a physical classroom setting with the exchange of information through online-based lectures, presentations, question-and-answer interaction sessions, and other related online modalities. Similarly, corporate and other institutions have also adopted online systems for the delivery of in-house and/or compliance training, online-based certification testing, information distribution (e.g., newsletters, speeches, podcasts, online sermons, etc.), and other related functionality.

Due to their overall success, such online and network-based systems are quickly becoming the rule instead of the exception. However, while these systems have proven to streamline and expand the distribution of information in many cases, there is often a portion of the intended recipients who either do not fully understand the delivery language and/or cannot sufficiently interpret the same in a timely manner. Because of this, inequality of access can result, the effects of which can be extremely disastrous from both individual and societal perspectives. Primarily, and perhaps obviously, inequality of access prevents the affected individuals from receiving an experience (educational or otherwise) that is equivalent to that received by their counterparts who are either fluent or otherwise able to effectively communicate in the delivery language. Furthermore, inequality of access also results in far-reaching societal impacts in that it reinforces inequality in opportunities for economic mobility and social participation for those individuals in such groups. The systems, methods and techniques for providing interpretation services of the present disclosure can alleviate this disparity in access such that all individuals can gain equal access to information.

While the communication system 200 has previously been described herein as a stand-alone system, in at least one exemplary embodiment, it can alternatively comprise an application or platform integrated with other third-party systems such as, for example, a course management or learning management system ("CMS/LMS") for use in delivering online courses, augmenting on-campus courses, and/or automating record-keeping and employee registration. In such embodiments, the communication system 200 may be configured to provide add-on functionality to such systems so that a user (e.g., a professor or corporate administrator) may easily and accurately have aural content interpreted into the desired language(s) and published and/or distributed such that users of the CMS/LMS can access the same in connection with their use of the CMS/LMS. It will be appreciated that, unless expressly indicated otherwise, any functionality of the communication system 200 described in connection with the integrated system 300 may also be accessed/used in connection with the communication system 200 when employed as a stand-alone system.

Figure 4:
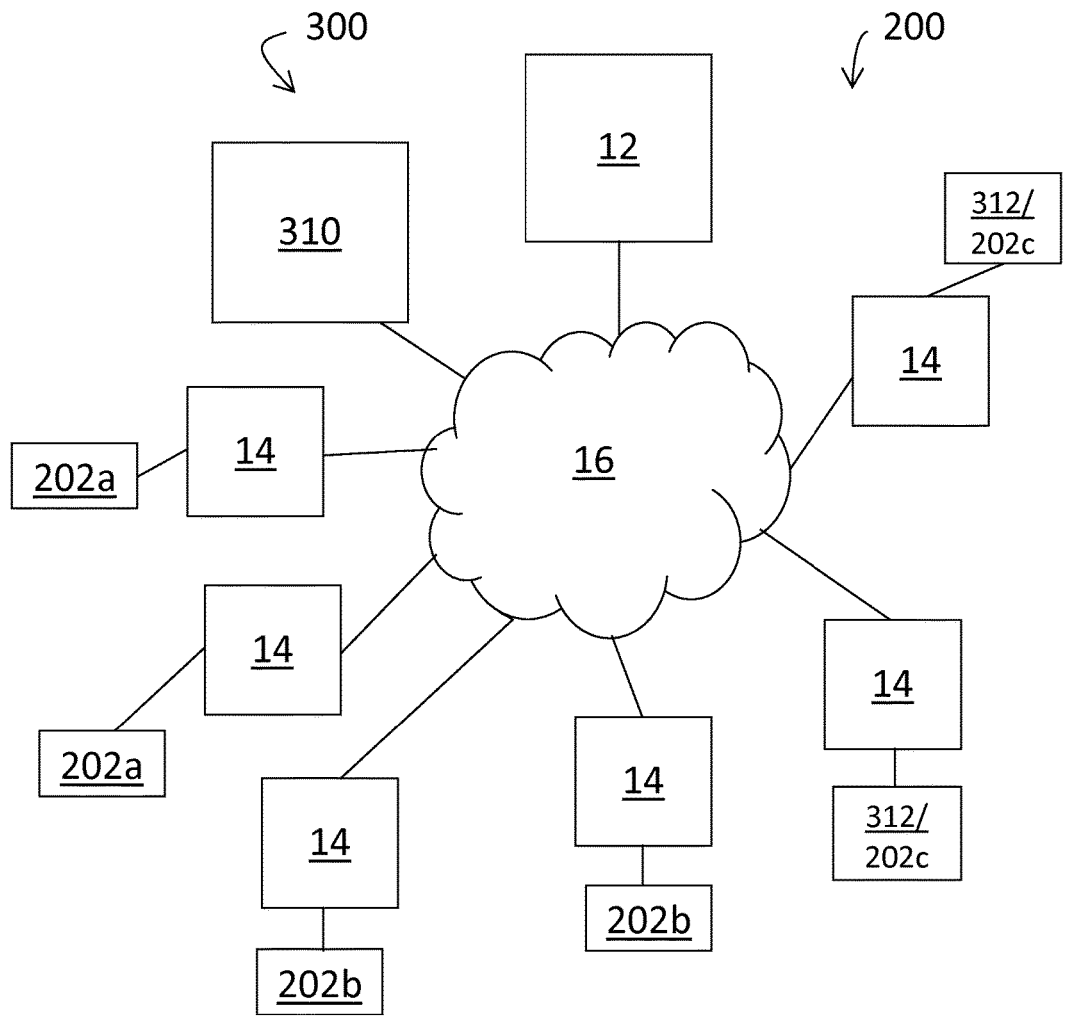
FIG. 4 shows a schematic/block diagram of an integrated system comprising the communication system of FIG. 1 integrated with a course and/or learning management system according to exemplary embodiments of the present disclosure.
Figure 5:
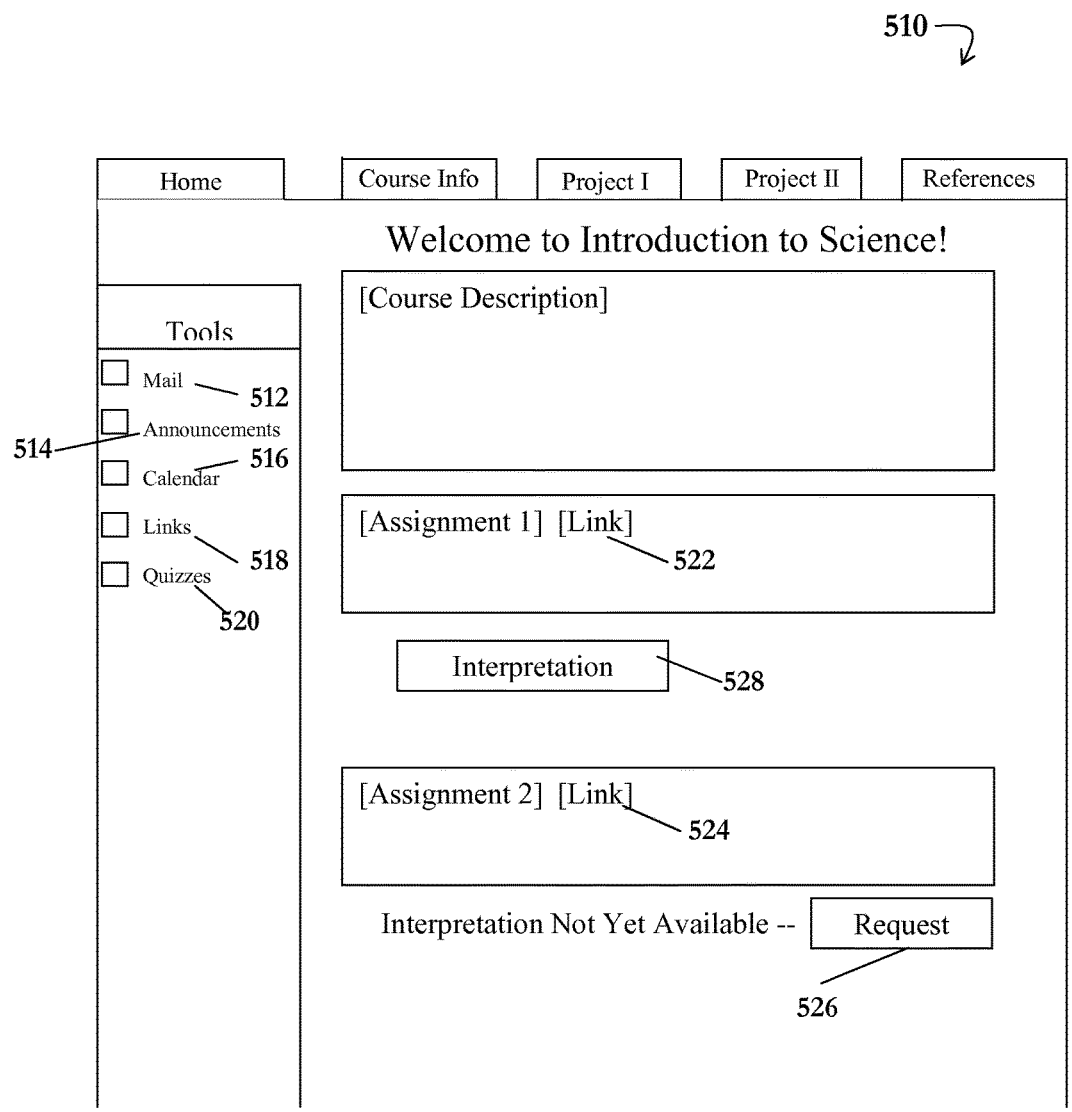
FIG. 5 shows an exemplary embodiment of course page that may be used to access components of the functionality of the integrated system of FIG. 4 according to exemplary embodiments of the present disclosure.

Referring now to FIGS. 4 and 5, consider, for example, an academic institution that utilizes a CMS/LMS 310 to deliver curriculum to its students. Such course/learning management systems conventionally comprise a secured environment that a student user 312 may log into and/or access in connection with his or her studies at the relevant academic institution. A student can access various web pages or interfaces within the environment that are associated with his or her studies at the institution (for example, a course page 510 associated with a class in which he or she is currently enrolled).

It is through these course pages/interfaces that professors, teachers, teaching aids and the like provide curriculum and other information to their students via such educational platforms. Not only can content be uploaded and/or linked to such pages for student user 312 review (e.g., [Assignment 1] [Link] 522 of FIG. 5, representative of the same), but other academic-related functionalities—such as online quizzes, question-and-answer sessions, online lectures and other modalities—may also be delivered therethrough (e.g., tools 512-520 of FIG. 5). As these functionalities develop and become more comprehensive, they have and will continue to increasingly utilize aural/spoken components in addition to written content to facilitate the learning experience (e.g., a video recording of a class lecture or a slideshow presentation accompanied by a voiceover narrative explaining the slides).

To ensure full access to all student users 312 of the materials made available through a CMS/LMS 310, the communication system 200 may be integrated with the system 310 and utilized to provide easily accessible, timely and accurate interpretation services (collectively, the "integrated system 300"). For example, as shown in FIG. 5, the functionality of the communication system 200 may be easily accessed by the incorporation of communication system 200-specific graphical control elements into the various user interfaces of the CMS/LMS 310. When activated, the integrated system 300 runs the communication system 200 concurrently with the CMS/LMS 310—either using prompts and/or user interfaces displayed in pop-up windows, within the user interface of the CMS/LMS 310 itself (e.g., as a window within the course page or a user's home page) or as otherwise known in the art or hereinafter developed. The extent to which the functionality of the communication system 200 is available to users 312 of the CMS/LMS 310 may be customized pursuant to administrator preference or otherwise. For example, only specific categories of users 312 may be afforded the ability to request Content interpretations, while other categories of users 312 either cannot request interpretations at all or such requests may only be activated or acted on upon approval. In certain embodiments, an administrator may manipulate the credentials and/or access permissions of different users 312 (either individually or on a user-category basis) such that only those users 312 with the appropriate authority/credentials can activate the communication system 200 without prior approval. By way of non-limiting example, the permissions of the integrated system 300 may be configured such that while a student user 312 may indicate a desire/need for an interpretation, the professor associated with the relevant course must ultimately approve the request. As such, in those cases, approval from an appropriately credentialed user 312 is required before the communication system 200 distributes the request to interpreter users 202b and Interpreted Content is produced.

The operation of the system 200 when integrated with a CMS/LMS 310 in an integrated system 300 is similar to the embodiments previously described herein. Namely, a user 312 of the system 310 uploads and/or links Content to the CMS/LMS 310 in a course page or otherwise (e.g., [Assignment 1] [Link] 522 and [Assignment 2] [Link] 524 of FIG. 5, representative of the same), thus using the communication system 200 as a requesting user 202a. Other users 312 may then have a window of time (defined or open-ended, depending on the particular parameters established) during which they may access and review such Content. Where interpretation of the Content is needed/desired, an interpretation request may be made via a request button 526 or other graphical control element present within the CMS/LMS' 310 user interface.

Figure 6:
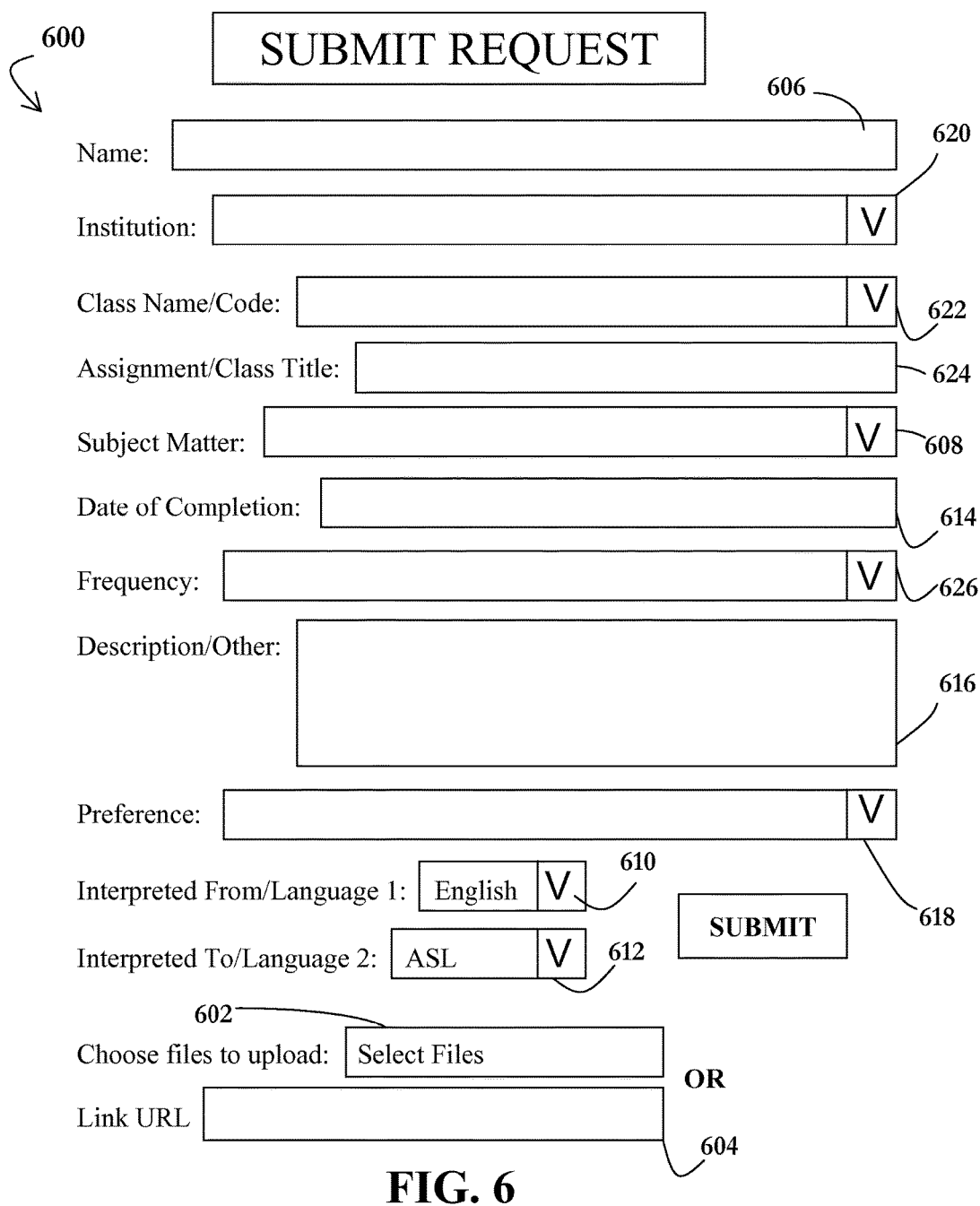
FIG. 6 shows an exemplary embodiment of user interface that may be used with the integrated system of FIG. 4 according to exemplary embodiments of the present disclosure.

It will be understood that when a user 312 of the integrated system 300 has the appropriate credentials (or has obtained the requisite approval) and requests an interpretation, that user 312 then becomes a requesting user 202*a* as described in connection with the communication system 200. Upon activation of the communication system 200, the user 312/requesting user 202*a* is prompted to provide additional detail regarding the interpretation request and to upload and/or link the Content to the system 200. FIG. 6 depicts at least one embodiment of a request interface 600 that may be used to gather such information; however, it will be appreciated that FIG. 6 is merely provided by way of explanatory example. Indeed, the request interface 600 is fully customizable and may comprise any format that is capable of collecting information from the user 312/requesting user 202*a* regarding a specific interpretation project.

Similar to the request interface 250 previously described in connection with FIG. 2E, request interface 600 is configured such that the Content can be uploaded to the server 12 of the system 200 (see field 604). Additionally or alternatively, the request interface 600 may also provide a field for receiving a hyperlink or other means for accessing the Content over the network 16 (see field 604). As previously noted, the request interface 600 may also be configured to collect certain information from the user 312/requesting user 202*a* regarding the particular interpretation project. For example and without limitation, the request interface 600 may be configured to collect a) requesting user information (e.g., name field 606, contact information (not shown), etc.), b) content-specific information (e.g., subject matter area dropdown menu 608, original language dropdown menu 610, desired language dropdown menu 612, etc.), and/or c) project-specific information (e.g., requested completion date field 614, general description field 616, compensation information (not shown), etc.). Additionally, the request interface 600 may also comprise one or more text fields in which the user 312/requesting user 202*a* can enter any other information regarding the project (not shown) and/or, in at least one exemplary embodiment, a graphical control element through which a user 312/requesting user 202*a* can indicate a preference for one or more specific interpreters. For example, the request interface 600 may be configured such that the user 312/requesting user 202*a* can select the desired interpreter user's 202*b* name or system ID number from an established list (see preference dropdown menu 618) or enter the same via text or otherwise. Still further, in at least one embodiment, the request interface 600 additionally comprises a toggle button or other element that enables the requesting user 202*a* to indicate his or her preference with respect to adding verification services to the project (not shown).

In addition to the aforementioned elements, the request interface 600 may also comprise input fields related course-specific information such that the interpretation project can be associated with a specific course or group provided over the CMS/LMS 310. For example, the request interface 600 may additionally comprise fields configured to collect course information such as an entity affiliation dropdown menu 620, geographic location (not shown), course number/level dropdown menu 622, age range of intended audience (not shown), and/or assignment title field 624.

Furthermore, the request interface 600 may optionally be configured such that the user 312/requesting user 202*a* can identify if the interpretation project is ongoing or a one-time occurrence (see dropdown menu 626). For example, if the Content comprises a slide show presentation with a voiceover component, the user 312/requesting user 202*a* may only desire that the interpretation services be provided in a single occurrence (i.e. the slideshow/voiceover is interpreted, the Interpreted Content is provided, and the project is complete). Alternatively, a user 312/requesting user 202*a* may desire to use the communication system 200 in connection with a lecture that is recorded weekly. In such cases, rather than entering a new request for interpretation services each week, the user 312/requesting user 202*a* may set the frequency of the project to weekly (or to any other time period as may be desired). In such cases, the communication system 200 may also be configured such that the user 312/requesting user 202*a* can provide a start date and end date for each project, or any other information that may be relevant to the ongoing project as it is associated with the integrated system 300.

Accordingly, communication system 200 is configured to provide a straightforward means for data entry regarding the interpretation project that may be seamlessly and conveniently accessed and submitted through the CMS/LMS 310 (either through the request interface 600 or the like). After the user 312/requesting user 202*a* has provided the appropriate project information, the Content and interpretation request are uploaded and/or linked to the server 12.

When an interpretation request is received by the communication system 200, the applicable interpreter users 202*b* are notified of the available request. In at least one exemplary embodiment, a message containing the relevant request information is automatically generated by the communication system 200 and transmitted to the appropriate interpreter users 202*b* (a "Request Message"). Alternatively, an administrator may generate and transmit the Request Messages to the appropriate interpreter users 202*b*. Where an interpretation request does not identify one or more preferred interpreter users 202*b* or any criteria with respect to the interpreter users' 202*b* credentials or experience, the Request Message may be transmitted to every interpreter user 202*b* registered and/or active on the communication system 200. Conversely, where a specific interpreter user 202*b* and/or criteria have been identified, the Request Message will be transmitted only to those interpreter users 202*b* who satisfy the same.

Additionally or alternatively, it may be desirable for the Request Message to be forwarded to a disability or minority service office associated with the institution employing the integrated system 300 (or otherwise) such that an interpreter coordinator or other administrator can oversee and track the interpretation requests.

The Request Message may comprise a text message, an internal message (accessed through hyperlink 361*b* via the project menu interface 360 of FIG. 3B, for example), an instant message, an e-mail message or the like. A Request Message may include detailed information regarding the interpretation request (see, for example, the request interface 370 of FIG. 3D) or merely a notification that a new request is available and a link to more information (e.g., a hyperlink that directs the interpreter user 202*b* to the request interface 370 shown in FIG. 3D or a similar interface). In at least one exemplary embodiment, the Request Message may include one or more buttons or the like through which an interpreter user 202*b* can accept or decline the project directly from the Request Message text (see, for example, accept/record button 372 of request interface 370).

As previously described in connection with the communication system 200 applied in a stand-alone format, where an interpreter user 202*b* declines a project, the interpretation request remains active on the system 200, but if accepted, the communication system 200 immediately assigns it to the accepting interpreter user 202*b* and identifies it as filled to other interpreter users 202*b*. After an interpretation request has been filled, the accepting interpreter user 202*b* can access the Content and record the interpretation as previously described in connection with the stand-alone application of the system 200. The resulting preliminary Interpreted Content (the particular file formats accepted may be customized pursuant to user preference) may be optionally verified for accuracy and/or quality (depending on the requesting user's preference), finalized and thereafter uploaded or linked back to the server(s) 12 such that it is stored.

Upon completion of a project, if the automatic billing and compensation functionality of the communication system 200 is employed, the communication system 200 will automatically calculate the amount of compensation due to the interpreter user 202*b* (based on the time spent interpreting the Content as tallied/recorded by the system and any other applicable charges) and automatically bill the requesting user 202*a* the cost of the interpretation. As previously described herein, the interpreter user's 202*b* bank account information may be available to the server 12 such that the communication system 200 can automatically deposit any compensation owed therein. It will be appreciated that requesting users 202*a* may also provide payment information upon registration such that the cost of the services can be automatically paid as well. Alternatively, the communication system 200 can simply invoice the requesting user 202*a* upon completion of a project or pursuant to other terms that may be established.

In at least one exemplary embodiment associated with use of the integrated system 300, designated workstations may be provided to students that are configured to access the communication system 200 and further comprise card readers capable of taking payment information. Accordingly, a student requesting user 202*a* can access the communication system 200 through the designated workstation (client 14), submit an interpretation request therethrough, and pay for the same by swiping their card (credit or debit card, campus identification card, or other device linked to a monetary account) through the card reader on the client 14. Alternatively, a requesting user 202*a* could be prompted to enter payment information through a pop-up window or other user interface.

Under certain circumstances, the requesting user 202*a* may not be directly responsible for payment of the interpretation services. For example, when the integrated system 300 is used in connection with the provision of online educational services or corporate training, the institution or employer may cover the cost of the interpretation services, not the requesting user 202*a* (professor or employee). Accordingly, the communication system 200 may be configured such that when a requesting user 202*a* is associated with a particular entity or institution, the associated institution's/entity's account will be invoiced for the fees rather than the requesting user's 202*a*. In at least one embodiment, an institution/entity may allocate a specific amount of funds for the requesting user's 202*a* use in connection with the communication system 200, in which case such funds will be used to pay the appropriate invoices. Now referring back to the Integrated Content stored on the server 12 and/or accessible by the system 200 that results from the interpretation services, the system 200 is configured such that access permissions may be defined pursuant to the requesting user's 202*a* preferences. For example, where a professor requests the interpretation services in connection with Content provided through an online course, the access permissions associated with resulting Integrated Content may be assigned such that the Integrated Content is associated with that course on the CMS/LMS 310. Accordingly, only users 312 who are members of the appropriate course can access and view the Interpreted Content. In at least one embodiment, and as shown in FIG. 5, the Interpreted Content may be directly linked to a particular course page (e.g., Interpretation button 528) such that student users 312 may access the Interpreted Content therethrough.

Figure 7:
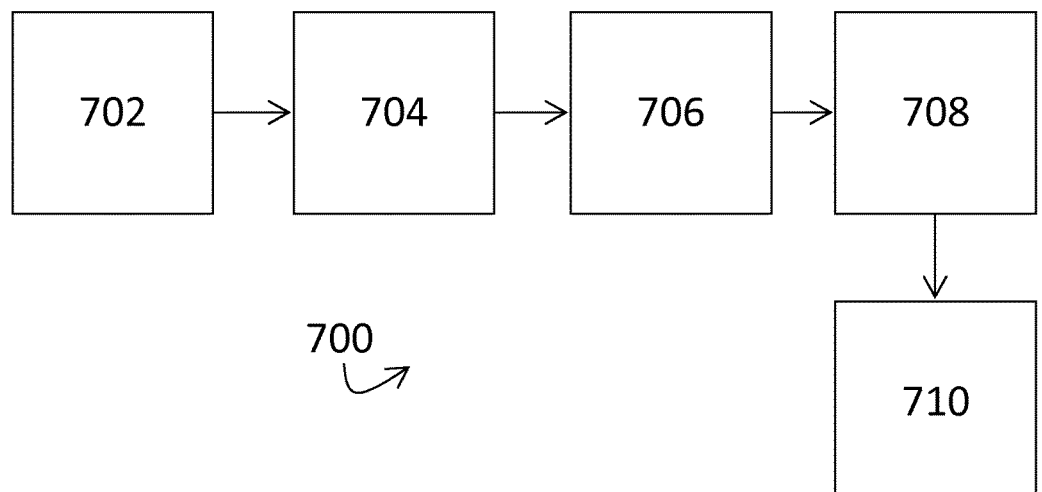
FIG. 7 shows a flow chart representing a method for requesting interpretation services via the communication system of FIGS. 1 and/or 4 according to exemplary embodiments of the present disclosure.
Figure 8:
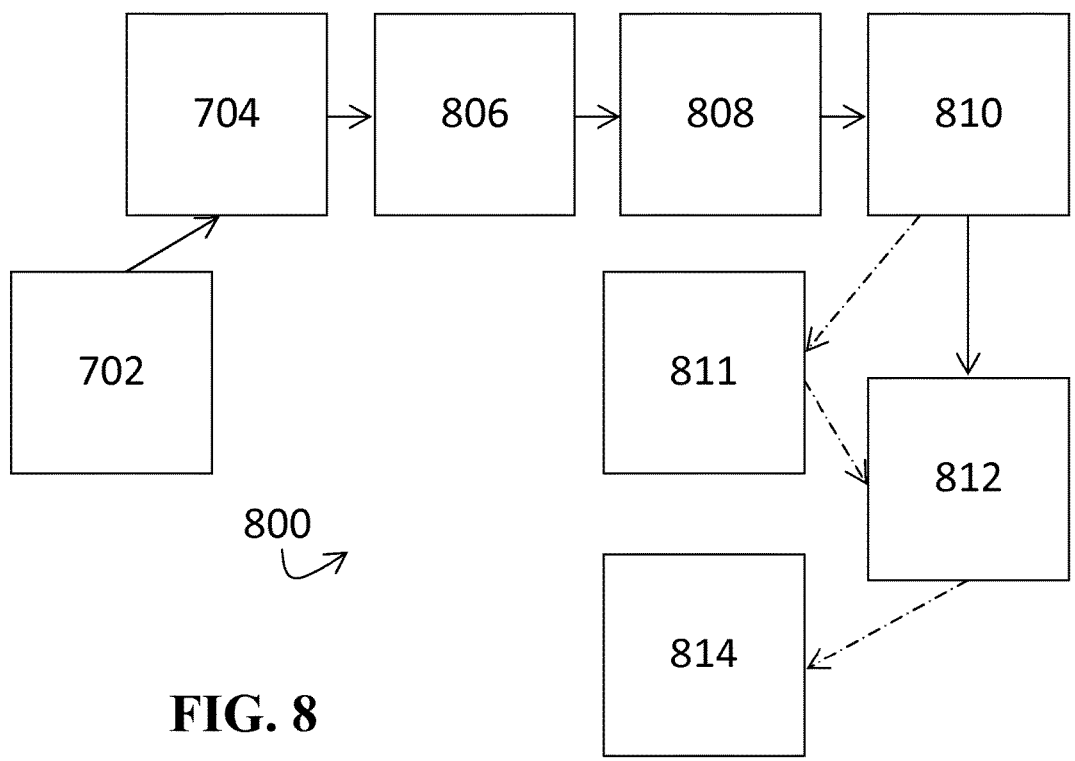
FIG. 8 shows a flow chart representing a method for providing interpretation services via the communication system of FIGS. 1 and/or 4 according to exemplary embodiments of the present disclosure.

Now referring to FIGS. 7 and 8, flow charts of methods for providing interpreting services across a network are shown as performed in accordance with one or more embodiments hereof. In some embodiments, as shown in FIGS. 7 and 8, techniques for providing interpreting services across a network may include various operations. For the sake of clarity, the overall process described herein has been broken down into two component parts—a method 700 for requesting interpretation services through the communication system 200 and a method 800 for interpreting Content using the communication system 200. It will be appreciated that method 700 may be combined with method 800 to achieve the desired results. In other words, embodiments of the overall process for providing the services described herein need not comprise both methods 700, 800 in combination.

FIG. 7 illustrates a flow chart of a method 700 for requesting interpretation services through the communication system 200. Upon deciding to utilize the communication system 200 to obtain interpretation services, a potential user can enter the method 700 at step 702 by providing information to the server 12 via one or more clients 14 to create a user profile. For example, a potential system 200 user provides its registration information at step 702, which may include (without limitation) its name, address, and other contact information, as well as identifying any affiliation with one or more institutions operating on the system 200.

The potential user may also provide information at step 702 relating to its desired use of the communication system 200. Such information may relate to whether or not it desires to use the communication system 200 as an interpreter user 202*b* or as a requesting and/or recipient user 202*a*, 202*c*. In at least one exemplary embodiment, the particular information the potential user is asked to provide at step 702 is dependent upon the category of user 202 in which the potential user falls. Where a potential user is an interpreter, the information provided as step 702 may relate to their interpretation experience level, any subject matter expertise, and/or awarded certifications. Additionally, the user may be prompted to register a workstation or device (e.g., a smartphone, tablet or other device) with the system 200 and/or provide bank account information for direct deposit purposes.

Likewise, where a potential user is an individual or entity who desires to utilize the system 200 to request interpretation services and/or access Interpreted Content, the information provided at step 702 may define interpretation preferences (e.g., set a default language, identify interpreter preferences, etc.) and/or be related to payment information for covering any fees associated with their use of the system 200.

While specific examples have been provided regarding the type of information collected by the system 200 at step 702, it will be appreciated that the communication system 200 is fully customizable. Accordingly, an administrator can establish the type and amount of information requested by the communication system 200 at step 702 in accordance with any particular application of the system 200, may tailor specific information requests to different categories of potential users, and may even tailor information requests to be associated with potential users that are affiliated with different organizations or entities. For example, where both a corporate entity and a university establish accounts with the system 200, an administrator may configure the system 200 such that certain information is requested from the university-affiliated users (e.g., courses, professors, major, etc.), while different information is requested from the corporate entity-affiliated users (e.g., job title, etc.).

Following information gathering step 702, the method 700 progresses to step 704. At step 704 (a step of accessing system 200), the user 202 gains access to the server 12 of the system 200 by logging on in its capacity as either an interpreter user 202b or a requesting/recipient user 202a, 202c. In an exemplary embodiment, the user 202 may access the server 12 at step 704 via an application that prompts the user 202 to enter a username, password and/or other form of identification. Once authenticated, the user 202 is provided access to the server 12 and the information stored thereon. Additionally, in at least one exemplary embodiment, the system 200 may assign each user 202 a unique identifier (such as a system ID) for use with the system 200 such that the personal identities of the users 202 remain anonymous unless and until a user 202 specifically provides permission otherwise.

In at least one embodiment, a user's 202 access may be limited to only those databases, records, and/or content of the system 200 for which it has the appropriate credentials. In this manner, method 700 may provide a layer of security to the communication system 200 to ensure that only authorized users 200 gain access to any sensitive or confidential information stored thereon.

Such credentials may be user category specific (i.e. all interpreter users 202b may have the same credentials and requesting/recipient users 202a, 202c may have the same credentials). Additionally or alternatively, credentials may be assigned to each user 202 individually at registration step 702 or at some later step in the method 700. For example, where a requesting/recipient user 202a, 202c indicates an affiliation with an institution, such institution-affiliation may be used to dictate what credentials such user 202a, 202c is assigned.

Upon gaining access to the server 12 at step 704, a requesting user 202a can upload or link Content to be interpreted to the server 12 at step 706. In conjunction therewith or thereafter, at step 708, the requesting user 202a completes and submits an interpretation request that defines the parameters of the project associated with such Content (see FIGS. 2E and 6 for embodiments of user interfaces that may be used in steps 706 and 708). In at least one exemplary embodiment, the system 200 automatically generates/associates a unique request identification number with each submitted interpretation request such that the progress of such request and any associated deliverables (such as Integrated Content or verification reports) can be easily tracked throughout the communication system 200.

The interpretation request created at step 708 may be made available to all interpreter users 202b of the communication system 200 via a Request Message or otherwise or, alternatively, transmitted only to those interpreter users 202b having the proper credentials and/or qualifications. Additionally, where the system 200 is utilized by an entity employing an interpreter coordinator, a Request Message or other notice regarding the interpretation request may be sent to the appropriate person for tracking and/or oversight purposes at step 708.

In at least one embodiment, the project parameters specified by the requesting user 202a dictate which interpreter users 202b receive the interpretation request. For example, and without limitation, where a requesting user 202a indicates a preference for a male interpreter associated with a particular institution, only those interpreter users 202b identified as male and with an affiliation to the appropriate institution on the system 200 will receive the interpretation request. Still further, in at least one embodiment, a requesting user 202a may indicate their preference for a particular interpreter user 202b in an interpretation request. In such event, the interpretation request will be sent directly to such interpreter user 202b for review and acceptance. Additionally, where a requesting user 202a is associated with a particular institution (e.g., a university), and that institution desires only certain designated interpreter users 202b to be used (e.g., university-approved interpreters), the requesting user's 202a account may be restricted such that their available pool of interpreter users 202b is limited to only those interpreter users 202b of the system 200 designated by the relevant institution. In such case, while the requesting user 202a can still indicate interpreter preferences in their interpretation request, the preferences will be assessed only against a pool of institution-approved interpreter users 202b and not the totality of interpreter users 202b active on the system 200. Until an interpreter user 202b indicates acceptance of an interpretation request, the interpretation request will remain active on the communication system 200. At step 710, an interpreter user 202b who has been notified of the interpretation request accepts the project. Upon acceptance, the communication system 200 immediately assigns it to the accepting interpreter 202b and identifies it as filled.

Note that steps 702 and 704 of the method 700 need only be completed the first time a user 202 performs method 700. Accordingly, following a user's initial registration, a requesting user 202a who desires additional Content interpreted need only perform steps 706-710.

Now referring to FIG. 8, a flow chart illustrates a second component of a method for providing interpretation services across a network. Specifically, this component comprises a method 800 for interpreting Content using the communication system 200 and facilitates the provision of conveniently accessible and accurate Interpreted Content.

Similar to the method 700 previously described, each interpreter user 202b must advance through 702 and 704, at least upon initially accessing the system 200 (thereafter steps 702 and 704 need not be repeated). Upon gaining access to the server 12 at step 704, an interpreter user 202b may search, view and/or otherwise access a list of pending interpretation requests at step 806. In at least one exemplary embodiment, a list of available interpretation requests may be conveniently presented to the interpreter user 202b via a project queue user interface or the like (see, for example, FIG. 3D). The available interpretation projects listed in such a queue may be specifically designated for that particular interpreter 202b, interpretation requests having parameters that align with the interpreter user's 202b characteristics and/or qualifications, and/or may simply be general requests submitted to the system 200 that have not yet been accepted by another interpreter user 202b.

At step 808, the interpreter user 202b either accepts or denies an interpretation request listed on his or her project queue. Where an interpretation request is denied, the request is deleted from the interpreter user's 202b queue and, if the request was specific to that interpreter user 202b, in at least one embodiment, the system 200 automatically notifies the appropriate requesting user 202a as to the status of the request. Alternatively, where the interpreter user 202b accepts the interpretation request, at step 810 the interpreter user 202b accesses the Content and records the interpretation thereof.

As previously described in the present disclosure, due to the pre-recorded nature of the Content, the interpreter user 202b can start and stop the Content and/or interpretation thereof during this step 810, thereby enabling the interpreter user 202b to verify the accuracy and quality of his or her work. Furthermore, in at least one exemplary embodiment, the system 200 is configured to automatically tally and record the time the interpreter user 202b spends interpreting the Content (either in minute increments or otherwise). The parameters for how time is tallied may be customized pursuant to user (or administrator) preference. For example, in at least one embodiment, the communication system 200 is configured such that it will only tally the time an interpreter user 202b actively spends interpreting as a function of Content playback. There, the time spent with the Content actively playing will be tallied and recorded, however, should an interpreter user 202b pause or otherwise stop the Content—and/or log out of the system 200—the time associated with that project will likewise stop accruing. Thereafter, when the interpreter user 202b resumes playback of the Content, the communication system 200 will automatically resume counting the time.

In the event an interpretation request indicates that independent verification services are to be performed, after the interpreter user 202b completes the interpretation of the Content and produces a preliminary Interpreted Content file at step 810, the method 800 advances to step 811. At step 811, the accuracy and quality of the preliminary Interpreted Content is assessed and verified by another interpreter user 202b. For example, the preliminary Interpreted Content is made available to a second interpreter user 202b (either by transmitting the file over the system 200 or via link) and the second interpreter user 202b reviews the preliminary Interpreted Content and either makes or orders any appropriate changes thereto. In at least one exemplary embodiment, such independent verification services are performed by a designated verification specialist. Following this review and the implementation of any corrections that may be required, the preliminary Interpreted Content is finalized and the method 800 advances to step 812.

Alternatively, where independent verification services are not requested, after the interpreter user 202b completes the interpretation of the Content and is satisfied with his or her work product, the method 800 advances to step 812. At step 812, the preliminary Interpreted Content is finalized and uploaded to the server 12. Additionally, at step 812 the communication system 200 notifies the requesting user 202a that the Interpreted Content is available and either transmits a file containing the Interpreted Content to the requesting user 202a or provides a link that enables the requesting user 202a to access the same. Accordingly, the output of step 812 is the Interpreted Content, which the requesting user 202a may make available, through the system 200 or otherwise, pursuant to his or her preferences. For example, in at least one exemplary embodiment where the system 200 is integrated with a CMS/LMS 310 to form an integrated system 300, the requesting user 202a may publish the Interpreted Content—or otherwise provide a link thereto—on a particular course page such that the students of such course may freely access the same.

Method 800 may further comprise optional billing and compensation step 814. In at least one exemplary embodiment where the communication system 200 comprises billing and compensation functionality, at step 814 the system 200 automatically invoices the requesting user 202a for the time the interpreter user 202b spent creating the Interpreted Content (and any other applicable fees, such as those associated with independent verification services, if provided). Additionally or alternatively, the system 200 may be configured to automatically withdraw the appropriate funds from any bank account or fund linked with the requesting user's 202a profile on the system 200. Additionally, the interpreter user 202b may be automatically compensated at step 814 for his or her time, either through direct deposit or otherwise.

While various embodiments of the communication system and methods of using the same have been described in considerable detail herein, the embodiments are merely offered as non-limiting examples of the disclosure. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A computer-aided communication system useful in making content accessible to users, the system comprising:
    an interpretation platform comprising memory coupled with at least one server, the at least one server connected to a network and comprising at least one application capable of interacting with data stored at least partially in the memory of the interpretation platform;
    one or more workstations in communication with the network, each workstation located in any geographic location that has access to the network, configured to transmit recorded video content to the interpretation platform, and comprising a workstation user interface comprising at least a first portion and a second portion that are concurrently displayed, the first portion configured to record, edit and playback video content and the second portion for playing aural content; and
    a learning management system configured to provide a networked environment for the delivery of course content to a second set of credentialed users, the learning management system comprising:
        at least one learning management server,
        one or more user interfaces through which the second set of credentialed users can access course content stored on one or more of the at least one learning management servers, and a plurality of user devices in communication with the at least one learning management server, each user device capable of displaying at least one of the one or more user interfaces, wherein a first interface of the one or more user interfaces comprises an interpretation request interface configured such that a requesting user of the second set of credentialed users can interact with the interpretation platform via a first user device of the plurality of user devices and submit a request for interpretation to the at least one server of the interpretation platform, the request associated with at least a portion of the course content and comprising prerecorded audible content to be interpreted into a non-audible language; and wherein the interpretation platform is configured to:
receive, on the at least one server, the request for interpretation from the requesting user,
identify, by executing at least one of the at least one application of the server, a prescreened set of users of the first set of human users that satisfy a set of established criteria,
transmit the request for interpretation to the prescreened set of users over the network,
provide the prerecorded audible content to an accepting user of the prescreened set, the accepting user accessing the prerecorded audible content via the second portion of the workstation user interface,
receive, on the server, a converted response that comprises a recording prepared directly from the prerecorded audible content, the recording comprising video content showing the accepting user performing an interpretation of the prerecorded audible content into the non-audible language, and
provide the converted response to only the requesting user or to the second set of credentialed users through a second interface of the one or more user interfaces of the learning management system.

2. The system of claim 1, wherein the interpretation platform is integrated with the learning management system in a secured environment, the network comprises the Internet, the requesting user is an administrator or teacher of a course associated with the course content, and the one or more user interfaces of the learning management server further comprises a third user interface configured such that a student user of the second set of credential users can submit a preliminary request for interpretation to the requesting user for approval.

3. The system of claim 1, wherein the platform is further configured to:
provide the converted response to a second user of the first set for verification of the accuracy of the converted response;
receive the verified converted response from the second user of the first set; and
provide the verified converted response to one or more users of the second set.

4. The system of claim 3, wherein the platform is further configured to:
transmit a request for quality verification to a subset of users of the first set, the subset of users designated to provide verification services;
wherein the second user of the first set comprises a user of the subset.

5. The system of claim 1, wherein the prerecorded audible content comprises an audio-visual recording of an academic lecture and the learning management system comprises a learning management system of an academic institution.

6. The system of claim 5, wherein the non-audible language of the converted response comprises American sign language.

7. The system of claim 1, wherein:
the workstations of the accepting user comprises a visual input device and the converted response is recorded by the accepting user of the first set using the visual input device; and
the platform further comprises at least one component configured to transmit a signal of the prerecorded audible content to the workstation of the accepting user.

8. The system of claim 1, wherein at least one application of the at least one application of the interpretation platform is configured to assign each of the one or more human users of the first set a designated period of time during which such user is to be available, via the server, to receive and respond to a request for interpretation.

9. The system of claim 1, wherein the prerecorded audible content comprises audible information in English, the second portion of the workstation user interface is further configured to display aural and video content, and the non-audible language of the converted response comprises Sign Language.

10. The system of claim 1, further comprising a third party processing system that interfaces with an application of the at least one server of the interpretation platform to receive and process payment in exchange for each converted response.

11. A method for facilitating sign language interpretation services over a network useful in making interpreted content available to users, the method comprising the steps of:
providing a learning management system configured to provide a networked environment for the delivery of online content to a first set of one or more users, the learning management system comprising:
at least one learning management server,
one or more user interfaces through which the first set of one or more users can access content stored on one or more of the at least one learning management servers, and
a plurality of user devices in communication with the at least one learning management server, each user device capable of displaying at least one of the one or more user interfaces,
wherein a first interface of the one or more user interfaces comprises an interpretation request interface through which a requesting user of the first set of one or more users can request prerecorded content comprising an audible component and available through the learning management system be interpreted into sign language;
receiving, on an interpretation platform connected to a network and separate from the learning management system, a request for interpretation from a requesting user of the learning management system, the request submitted through the interpretation request interface of the learning management system;
transmitting the request for interpretation to a second set of human users over the network, the request accessible through the network via a workstation of each user of the second set of human users;
receiving, on the interpretation platform, acceptance of the request from at least one of the human users of the second set;

providing the prerecorded content to an accepting user of the second set via the interpretation platform;

converting the prerecorded content directly into a converted response comprising a visual performance of the accepting user interpreting the prerecorded audible content from a first audible language to sign language, the workstation of the accepting user comprising a user interface configured to edit and playback the converted response;

recording the converted response using a camera of the workstation of the accepting user;

receiving, on the interpretation platform, the recording of the converted response; and making the recording of the converted response available to either or both the requesting user or the first set of one or more users via a second interface of the one or more user interfaces of the learning management system.

12. The method of claim 11, further comprising the steps of:

identifying, by execution of at least one of the at least one application of the interpretation platform, a prescreened set of users of the second set of human users that satisfy a set of established criteria; and verifying the accuracy of the converted response; and wherein the step of transmitting the request for interpretation to a second set of human users over the network comprises transmitting the request for interpretation only to the prescreened set of users.

13. The method of claim 12, wherein the step of verifying the accuracy of the converted response comprises the steps of:

transmitting, over the network, a verification request from the interpretation platform to a subset of one or more of the second set of users designated to provide verification services; and receiving, on the interpretation platform, a verified converted response prepared by one of the designated users, the verified converted response corresponding with the converted response, but further reviewed for quality purposes.

14. The method of claim 11, wherein the prerecorded content comprises an audible lecture associated with an educational course supported by the learning management system and each of the one or more users of the first set comprises a participant in, an instructor of, or an administrator associated with the educational course.

15. The method of claim 11, wherein the camera of the workstation of the accepting user comprises a webcam and the step of providing the prerecorded content to an accepting user further comprises transmitting a signal of the prerecorded content to the accepting user such that the prerecorded content is accessible by the accepting user via the user interface of the workstation of the accepting user.

16. The method of claim 11, wherein the interpretation platform is configured to interface with a learning management system via one or more of the one or more user interfaces of the learning management system over an intranet.

17. The method of claim 11, wherein the step of converting the prerecorded content is performed by the accepting user of the second set and further comprises the steps of:

playing back a first portion of the prerecorded content using a first component of the workstation user interface;

converting the first portion of the prerecorded content into a first portion of the converted response and recording the first portion of the converted response;

stopping the playback of the prerecorded content using a second component of the user interface of the workstation of the accepting user, the second component displayed concurrently with the first component;

viewing the first portion of the recording of the converted response using the second component of the user interface of the workstation of the accepting user;

playing back a second portion of the prerecorded content using the second component of the user interface of the workstation of the accepting user; and converting the second portion of the prerecorded content into a second portion of the converted response and recording the second portion of the converted response.

18. A system for providing computer-aided interpretation services useful in making content accessible to users, the system comprising:

a means for receiving a request for interpretation services from a requesting user of a learning management system, the learning management system configured to provide a networked environment for the delivery of course or training content to a first set of users of the learning management system and comprising at least one learning management server and one or more user interfaces through which the first set of users can access the course or training content, and the request associated with the course content and comprising prerecorded content to be converted;

a means for transmitting the request for interpretation services to a prescreened set of one or more human users over a network, the prescreened set of users satisfying one or more defined criteria and the means for transmitting the request for interpretation services separate from the learning management system except for one or more interfaces through which the requesting user, the first set of users, or both can submit a request for interpretation or access a converted response;

a means for receiving acceptance of the request for interpretation services from at least one of the users of the prescreened set;

a means for providing the prerecorded audible content to be converted to the accepting user of the prescreened set, the means for providing the prerecorded audible content to be converted associated with at least a first component of an interface displayed on a workstation of the accepting user;

a means for recording the accepting user of the prescreened set converting the audible prerecorded content from a first audible language directly to a performance of a second visual language to create a converted response, the means for recording comprising at least a second component of the interface displayed on the workstation of the accepting user concurrently with the first component and configured to facilitate viewing, editing, and submitting the converted response to the system; and a means for providing the converted response to either or both the requesting user and the first set of users of the learning management system.

19. The system of claim 18, wherein:

the learning management system interfaces over an intranet with at least the means for receiving a request for interpretation services, the means for transmitting the request for interpretation services, and the means for providing the converted response to either or both the requesting user and the first set of users of the learning management system.

20. The system of claim 18, further comprising a means for verifying the accuracy of the converted response.

* * * * *